(12) United States Patent
Ohara et al.

(10) Patent No.: US 7,501,199 B2
(45) Date of Patent: Mar. 10, 2009

(54) FUEL CELL SEPARATOR

(75) Inventors: Hideo Ohara, Katano (JP); Hikaru Murakami, Saijo (JP); Masaaki Miyoshi, Ohzu (JP); Kazuhito Hatoh, Osaka (JP); Takeshi Tomizawa, Ikoma (JP)

(73) Assignee: Panasonic Corporation, Osaks (JP)

( * ) Notice: Subject to any disclaimer, the term of this patent is extended or adjusted under 35 U.S.C. 154(b) by 189 days.

(21) Appl. No.: 10/970,025

(22) Filed: Oct. 22, 2004

(65) Prior Publication Data

US 2005/0089598 A1    Apr. 28, 2005

(30) Foreign Application Priority Data

Oct. 24, 2003    (JP)    ............................. 2003-364936

(51) Int. Cl.
*H01M 2/14*    (2006.01)
(52) U.S. Cl. ...................... 429/129; 429/247; 429/122; 429/38; 429/12
(58) Field of Classification Search ................ 429/129, 429/247, 122, 38, 12
See application file for complete search history.

(56) References Cited

U.S. PATENT DOCUMENTS

| 6,528,196 | B1 | 3/2003 | Fujii et al. |
| 2002/0197523 | A1 | 12/2002 | Ohara et al. |
| 2003/0170528 | A1* | 9/2003 | Simpson et al. ............... 429/38 |

FOREIGN PATENT DOCUMENTS

| JP | 11-339823 | 12/1999 |
| JP | 2001-52723 | 2/2001 |
| JP | 2003-242994 | 8/2003 |
| KR | 2002-0094908 | 12/2002 |

OTHER PUBLICATIONS

Japanese Office Action issued in Japanese Patent Application No. JP 2004-307381, mailed May 1, 2007.

* cited by examiner

*Primary Examiner*—Jane Rhee
(74) *Attorney, Agent, or Firm*—McDermott Will & Emery LLP

(57) ABSTRACT

A mold for a use of making a fuel cell separator comprises: a first flow path forming portion to form a cooling medium flowing path, or to form an oxidizing gas flowing path, or to form a fuel gas flowing path; and an injection gate to shoot out a forming material settled on the first flow path, and/or disposed at near place with the first flow path.

2 Claims, 17 Drawing Sheets

Fig.1A
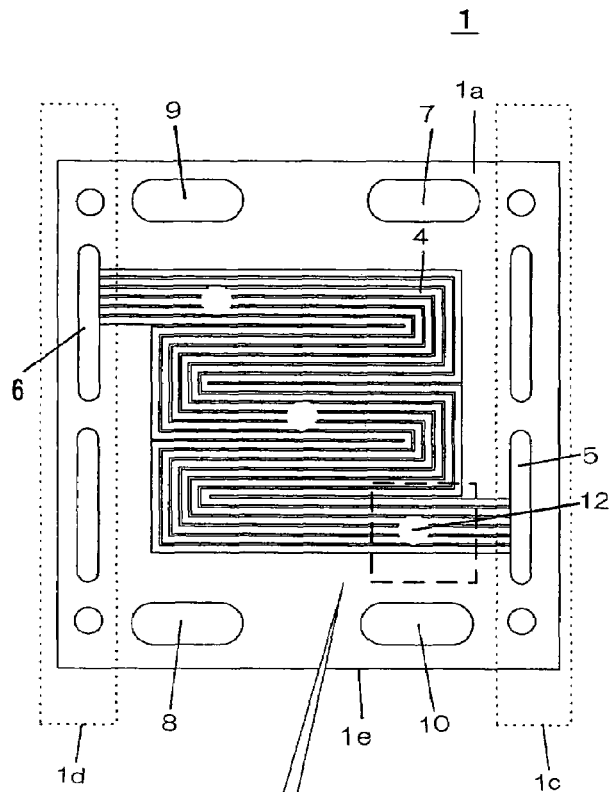
Fig.1B
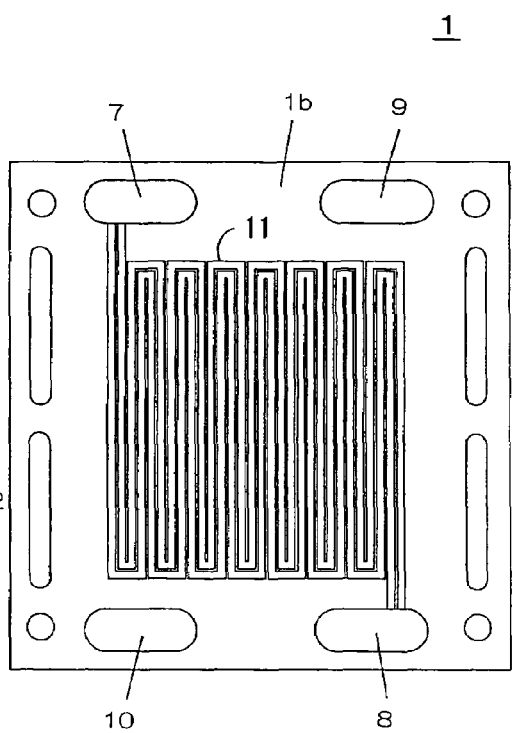
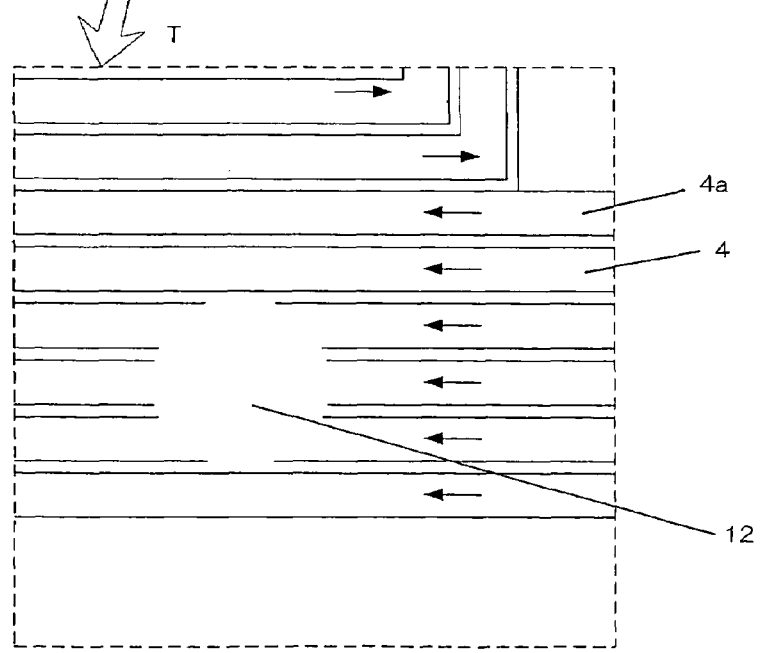

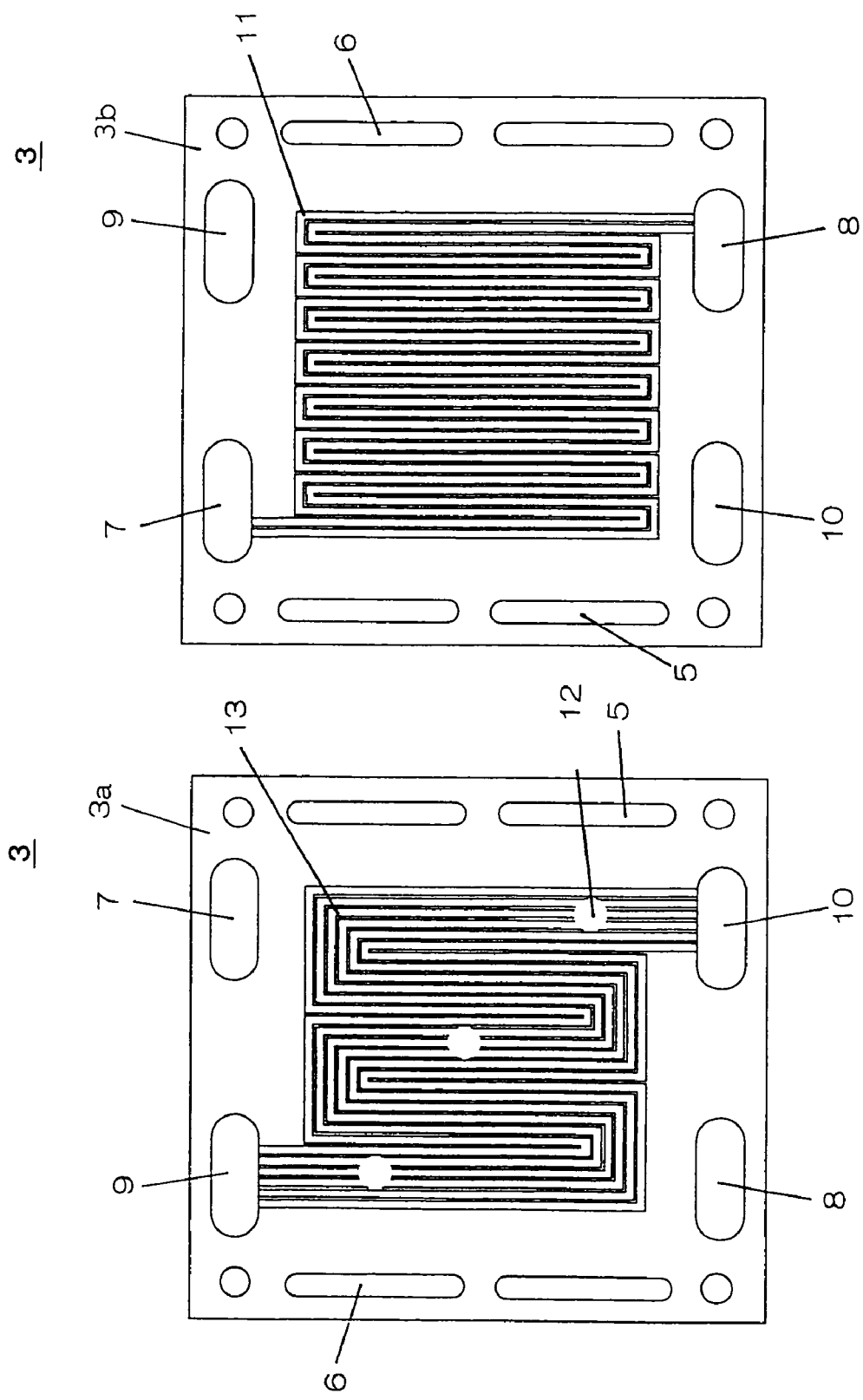

FUEL CELL SEPARATOR

BACKGROUND OF THE INVENTION

1. Field of the Invention

The present invention relates to a separator for fuel cell for use in portable power supply, power supply for electric car, household cogeneration system, etc., a fuel cell, a method of producing a fuel cell separator, an apparatus of producing a fuel cell separator and a mold for use in the production of the fuel cell separator.

2. Related Art of the Invention

A fuel cell comprising a solid polymer electrolyte undergoes electrochemical reaction of a fuel gas containing hydrogen with a fuel gas containing oxygen such as air to generate electric power and heat at the same time. The configuration of the solid polymer electrolyte will be described below.

Firstly, a catalytic reaction layer mainly composed of a carbon powder having a platinum group metal catalyst supported thereon is formed on the both sides of a polymer electrolyte membrane which selectively transports hydrogen ion.

Subsequently, a diffusion layer having a permeability to fuel gas and an electronic conductivity in combination is formed on the outer surface of the catalytic reaction layer. The diffusion layer and the catalytic reaction layer together form an electrode. The combination of the polymer electrolyte membrane and the electrode is called as MEA (membrane-electrode assembly).

Subsequently, a gas sealing material or gasket is provided around the electrodes with the polymer electrolyte membrane interposed therebetween such that the fuel gas supplied cannot leak from MEA to the exterior or the two fuel gases cannot be mixed with each other. The sealing material or gasket has been previously integrated to the electrode and the polymer electrolyte membrane. The assembly thus integrated is called as MESA (membrane-electrode-seal assembly).

MESA has a separator disposed on the outer side thereof. This separator acts to mechanically fix MESA and connect adjacent MEA's to each other in series. A gas flow path is formed at the site where the separator comes in contact with MEA. This gas flow path is adapted to supply a reactive gas onto the surface of the electrode and carry out produced gas, extra gas or water produced by reaction away. The gas flow path may be provided separately of the separator but is normally formed by providing a groove on the surface of the separator.

In order to supply a fuel gas into the groove provided on the surface of the separator, pipe fittings are needed. In other words, these pipe fittings are adapted to branch the fuel gas piping into pipings by the number corresponding to the number of the separators used and connect these branches directly to the grooves on the separator. This pipe fitting is called manifold. The type of the manifold which connects the aforementioned fuel gas supplying piping directly to the groove on the separator is called external manifold. There is also a type of manifold having a simpler configuration called internal manifold. The internal manifold is formed by providing a through-hole in the separator having a gas flow path formed thereon. The inlet and outlet of the gas flow path are disposed in the hole so that the fuel gas can be directly supplied from the hole into the gas flow path.

Since a fuel cell generates heat during operation, cooling medium such as water is necessary for the fuel cell to be kept in a suitable temperature state. In general, a cooling portion is provided interposed between separators every 1 to 3 units of fuel cell. In this case, the cooling portion is mostly provided by forming a cooling medium flow path on the back surface of the separator. These MEA's, separators and cooling portions are alternately stuck with 10 to 200 cells. Thereafter, the laminate of MEA, separator and cooling portion is clamped between end plates with a collector and an insulating plate interposed therebetween. The assembly is then fixed on the both sides thereof by a fastening bolt. This is an ordinary configuration of stuck fuel cell.

In this type of a solid polymer electrolyte fuel cell, the separator is required to meet the following requirements (1) to (5) In some detail, the separator needs to have a high electrical conductivity (requirement (1)). The separator needs to have a high tightness (requirement (2)). Further, the separator needs to have a high corrosion resistance to the reaction occurring during the reduction and oxidation of hydrogen/oxygen (requirement (3)). In addition, the separator also needs to have a heat resistance up to at least 100° C. (requirement (4)). This is because the fuel cell is normally operated at a temperature of around 100° C. or less. Finally, the separator also needs to have a high mechanical strength (requirement (5)). This is because MEA and the separator need to be fastened to each other at a face pressure of at least few kilograms-force per $cm^2$ to reduce contact resistivity.

Since the separator needs to meet the aforementioned requirements (1) to (5), the related art separators have heretofore been conventionally formed by a carbon-based material such as glassy carbon and expanded graphite. Further, the gas flow path on the related art separator has heretofore been formed by cutting the surface of the separator or, if the separator is formed by expanded graphite, molding the gas flow path.

Recently, a separator prepared by compression-molding a mixture of graphite and a resin in a mold has been also used to reduce the cost of separator.

In recent years, an attempt has been made to prepare a separator by injection-molding a mixture of graphite and a resin (see JP-A-11-339823). This is because when the approach thus produced is conducted, the producing time can be reduced, making it possible to further reduce cost. When this approach is made possible, the producing facilities for the production of separator becomes simpler than the facilities for compression molding.

The entire disclosure of JP-A-11-339823 is incorporated herein by reference in its entirety.

Referring to the method of Preparation a separator by injection molding, as the separator material there is firstly prepared a compound comprising graphite and a thermoplastic resin in admixture. Subsequently, this compound is melt-kneaded in an injection molding machine. The compound thus melt-kneaded is then injected from the injection molding machine into the mold to form a separator. This method has been proposed.

Since the separator is required to have a high electronic conductivity, an approach is practiced to raise the proportion of electrically-conductive fillers in the compound. As the proportion of electrically-conductive fillers in the compound rises, the thermal conductivity of the compound rises and the fluidity of the molten compound during the injection from the injection molding machine falls. This results in extreme deterioration of moldability. This raises problems of underfilling, lack of strength at weld portions, etc.

In order to form a separator by injection molding rather than by cutting or compression molding, the following method and approach have heretofore been practiced. In some detail, referring to method, the injection molding material has heretofore been injected into the mold for separator from its periphery through a film gate or the like to mold separator. Referring to approach, the configuration of the flow path portion where the separator comes in contact with MEA has heretofore been almost the same as that of the separator prepared by cutting or like working.

Therefore, when the separator is prepared by injection molding, the molding material cannot sufficiently fill the mold for separator particularly at complicated flow path portions, giving some lack of uniformity in the material injected in the mold for separator. Further, since the separator material has a high thermal conductivity and thus cures quickly, weld portions can be easily produced in the mold for separator. Accordingly, the manifold portions disposed around the flow path on the separator has a reduced strength and a reduced air tightness to disadvantage. Thus, the preparation of separator by injection molding sacrifices the performance of the resulting fuel cell. In order to improve the fluidity of the molten material injected into the mold for separator, the configuration of flow path on the separator must be limited. Further, in order to compensate the low moldability during injection molding, the thickness of the separator must be raised. However, this improvement can cause the deterioration of cell performance or the rise of the dimension of the cell stack.

It is therefore an object of the invention to provide a mold for fuel cell separator which is assured a high dimensional stability, a high gas tightness, a reduced resistivity and a high mechanical strength, a fuel cell separator thus produced, a method and apparatus of producing same and a polymer electrolyte fuel cell comprising same.

It is another object of the invention to provide a mold for fuel cell separator capable of realizing enhanced reliability, enhanced cell performance and drastically reduced mass-production cost, a fuel cell separator thus produced by, a method and apparatus of producing same and a polymer electrolyte fuel cell comprising same.

SUMMARY OF THE INVENTION

The $1^{st}$ aspect of the present invention is a mold for a use of making a fuel cell separator, comprising:

(1) a first flowpath forming portion to form a cooling medium flowing path, or to form an oxidizing gas flowing path, or to form a fuel gas flowing path; and (2) an injection gate to shoot out a forming material settled on said first flow path, and/or disposed at near place with said first flow path.

As a result, the material injected from the gate can be controlled to be low viscosity and the transmission of the injection pressure of the molten material can be controlled with high reliability, the condition makes it possible to assure desired moldability of flowpath forming portion. Further, the sites (i.e. paths) other than the flow path forming portion have a less complex configuration than the flowpath forming portion, and as a result, provide for sufficient moldability even with the molten state of the material which has passed through the flow path forming portion.

The $2^{nd}$ aspect of the present invention is the mold for a use of making a fuel cell separator, as described in the $1^{st}$ aspect of the present invention, wherein a second flow path forming portion is disposed to form a flowing path for passing the medium or the gas.

As a result, when a mold arranged to obtain the aforementioned effect on moldability is used, various flow path configurations required for fuel cell separator can be freely designed. By providing the mold with flow paths to be formed on the other surface of the separator, an efficient mold giving a high productivity can be obtained.

The $3^{rd}$ aspect of the present invention is the mold for a use of making a fuel cell separator, as described in the $1^{st}$ aspect of the present invention, wherein the first flow path forming portion has convexly parallel streams, and the injection gate is settled over each of said streams.

As a result, when a molding material injection gate is provided extending over a plurality of raised portions, it makes possible to obtain a large opening area for material injection and a good moldability that cannot be governed by the shape of the separator.

The $4^{th}$ aspect of the present invention is the mold fuel cell separator as defined in the $3^{rd}$ aspect of the present invention, wherein molding material injection gate is formed on the first flow path forming portion where the direction of flow of a plurality of flow path grooves on the fuel cell separator formed by the plurality of flow path groove raised portions are the same.

As a result, the desired electricity-generating performance of the cell and the required pressure loss can be assured without preventing the fluid from flowing on the surface of the separator while making turns according to the flow path, making it possible to maintain the desired efficiency of the fuel cell system comprising this separator.

The $5^{th}$ aspect of the present invention is the mold for fuel cell separator as described in the $1^{st}$ aspect of the present invention, wherein molding material injection gate is formed in the vicinity of the center of the first flow path forming portion extending from the inlet to the outlet of the flow path formed by the first flow path forming portion.

As a result, the flow path resistivity received by the material flowing from the gate to the periphery of the separator during injection molding is made uniform over all directions. Therefore, the filling of the interior of the separator mold with the material is made uniform, reducing the molding time. Further, the distance over which the material flows is made uniform over all directions, making the radiating surface area with respect to the material thus packed uniform. Further, since the gate portion is disposed in the vicinity of the center of the flow path forming portion, a molten material in the most flowable state (having a low viscosity) is injected into the flow path forming portion having the highest flow path resistivity. Accordingly, the flow path resistivity against the molten material during the passage through the flow path forming portion can be reduced. Accordingly, this arrangement is suitable for the improvement of the moldability of the material in the mold (less surface roughness, higher strength of weld portion, higher packing of material), breathing properties, and dimensional accuracy. Moreover, the reduction of the flow path resistivity eliminates the necessity of a special molding machine capable of molding a material at high pressure, making it possible to reduce facility investment. This also results in an effect of reducing cost. Further, in the case where there are facilities capable of molding a material at high pressure, when the pressure at which the material is extruded remains the same, the time required for material to fill the mold can be reduced to reduce the molding cycle because the flow path resistivity is reduced. This makes it possible to enhance productivity and reduce cost.

The $6^{th}$ aspect of the present invention is the mold for fuel cell separator as described in the $3^{rd}$ aspect of the present invention, wherein molding material injection gate is provided in the oxidizing gas flow path or the cooling medium flow path forming portion.

As a result, the space required for the formation of the molding material injection gate can be easily assured. Thus, this arrangement is suitable for the provision of the molding material injection gate.

The 7th aspect of the present invention is a method of producing a fuel cell separator comprising a step of injecting a material into a mold for fuel cell separator as described in the 1st aspect of the present invention through the molding material injection gate and then injection-molding the material.

As a result, the mold precision can be accurately transferred to the injection molding material, making it possible to obtain a desired dimensional accuracy. Moreover, the production time per sheet of separator can be reduced, making it possible to enhance productivity. Thus, this arrangement allows cost reduction, enhancement of reliability and maintenance of stable cell performance.

The 8th aspect of the present invention is a method of producing a fuel cell separator as described in the 7th aspect of the present invention, wherein the material comprises a mixture of an electrically-conductive filler and a binder resin.

As a result, a high electrical conductivity can be realized. Further, the mechanical strength of the separator can be enhanced as well. Further, as the binder resin there can be selected a proper material from the standpoint of heat resistance and cleanness. Thus, a material mixed with a binder resin selected depending on the operating temperature range and the purpose of the fuel cell can be used. Accordingly, the material can be selected depending on the purpose of the separator, making it possible to drastically reduce cost.

The 9th aspect of the present invention is a fuel cell separator comprising a flow path surface formed thereon having an oxidizing gas flow path of supplying an oxidizing gas into one of a pair of electrodes disposed on the respective side of an electrolyte, a fuel gas flow path of supplying a fuel gas into the other of the pair of electrodes or a cooling medium flow path of cooling and at least one molding material injection gate mark formed in the flow path on the flow path surface or in the vicinity thereof.

The 10th aspect of the present invention is a fuel cell separator formed by a mold for fuel cell separator as described in any one of the 1st to the 6th aspects of the present invention.

The 11th aspect of the present invention is a fuel cell separator formed by a process for the production of a fuel cell separator as described in the 7th or the 8th aspect of the present invention.

The 12th aspect of the present invention is a fuel cell comprising a stuck of single cells having an electrolyte membrane, a pair of gas diffusion electrodes disposed on the respective side of the electrolyte membrane and a pair of separators disposed with the pair of gas diffusion electrodes interposed therebetween, wherein the separator is a fuel cell separator as described in the 9th aspect of the present invention.

The 13th aspect of the present invention is a fuel cell comprising a stuck of single cells having an electrolyte membrane, a pair of gas diffusion electrodes disposed on the respective side of the electrolyte membrane and a pair of separators disposed with the pair of gas diffusion electrodes interposed therebetween, wherein the separator is a fuel cell separator as described in the 10th aspect of the present invention.

The 14th aspect of the present invention is a fuel cell comprising a stuck of single cells having an electrolyte membrane, a pair of gas diffusion electrodes disposed on the respective side of the electrolyte membrane and a pair of separators disposed with the pair of gas diffusion electrodes interposed therebetween, wherein the separator is a fuel cell separator as described in the 11th aspect of the present invention.

The fuel cells comprising these separators have the same electrical conductivity, mechanical strength, heat resistance, cleanness and part precision as that of separator formed by cutting isotropic graphite. Further, the separator according to the invention has higher toughness and hence better impact resistance than separator formed by cutting isotropic graphite. Moreover, since the separator according to the invention can be produced by injection molding, the necessity of machining can be eliminated. Accordingly, the use of the separator according to the invention makes it possible to drastically reduce cost and enhance productivity.

The 15th aspect of the present invention is an apparatus of producing a fuel cell separator, comprising:

a mold for fuel cell separator as described in the 1st aspect of the present invention;

a nozzle for injecting a molding material into the molding material injection gate of the fuel cell separator; and a heating portion for heating the molding material to be injected into the molding material injection gate.

In accordance with the invention, a mold for fuel cell separator capable of assuring a stable dimension, high gas tightness, reduced resistivity or high mechanical strength, a fuel cell separator thus produced, a method of producing same, an apparatus of producing same and a fuel cell thus produced can be provided.

Further, a mold for fuel cell separator capable of enhancing the reliability and performance of cell and drastically reducing the production cost, a fuel cell separator thus produced, a method of producing same, an apparatus of producing same and a fuel cell thus produced can be provided.

Further, in accordance with the producing method of the invention, a separator and a fuel cell can be fairly produced.

BRIEF DESCRIPTION OF THE DRAWINGS

FIG. 1A is a plan view of the side of a separator (W/A) according to the Embodiment 1 of implementation of the invention on which a cooling medium flow path is formed;

FIG. 1B is a plan view of the side 1b of the separator (W/A) according to the Embodiment 1 of implementation of the invention on which a fuel gas flow path is formed.

FIG. 3A is a plan view of the side of a separator (C/A) according to the Embodiment 1 of implementation of the invention on which an oxidizing gas flow path is formed;

FIG. 3B is a plan view of the side of the separator (C/A) according to the Embodiment 1 of implementation of the invention on which a fuel gas flow path is formed.

DESCRIPTION OF THE REFERENCE NUMERALS

Figure 2B:
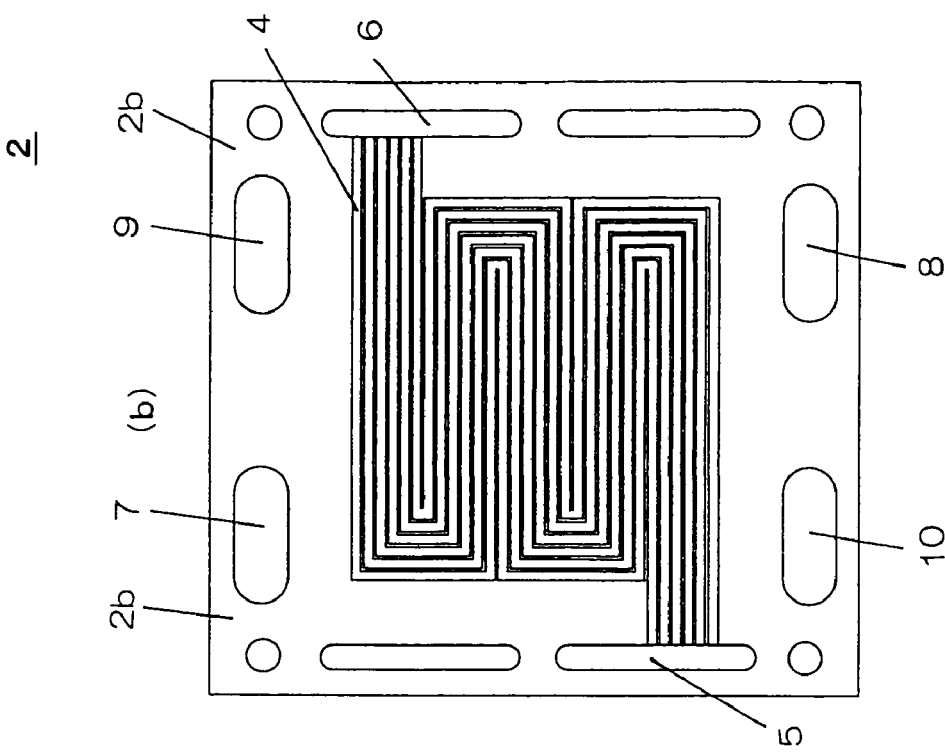
FIG. 2B is a plan view of the edge 2 of the separator (C/W) according to the Embodiment 1 of implementation of the invention on which a cooling medium flow path is formed.

1: separator (W/A)
1a: cooling medium flow path forming side of separator (W/A)
1b: fuel gas flow path forming side of separator (W/A)
2: separator (W/A)
2a: oxidizing gas flow path forming side of separator (W/A)
2b: cooling medium flow path forming side of separator (W/A)
3: separator (C/A)
3a: oxidizing gas flow path forming side of separator (C/A)
3b: fuel gas flow path forming side of separator (C/A)
4: cooling medium flow path
5: cooling water inlet manifold
6: cooling water outlet manifold
7: fuel gas inlet manifold
8: fuel gas outlet manifold
9: oxidizing gas inlet manifold
10: oxidizing gas outlet manifold
11: fuel gas flow path
12: molding material injection gate marks
13: oxidizing gas flow path
20: mold portion
21: molding material injection gate
22: cooling medium flow path forming portion
23: fuel gas flow path forming portion
24: manifold forming portions

PREFERRED EMBODIMENTS OF THE INVENTION

Embodiments of implementation of the invention will be described hereinafter in connection with the attached drawings.

Embodiment 1

The configuration of a separator according to the Embodiment 1 of implementation of the invention will be described below. FIGS. 1 to 3 are a plan view of three fuel cell separators according to the Embodiment 1 of implementation of the invention, respectively. FIG. 1A is a plan view of the side 1a of a separator (W/A) 1 on which a cooling medium flow path is formed. FIG. 1B is a plan view of the side 1b of the separator (W/A) 1 on which a fuel gas flow path is formed.

As shown in FIG. 1A, the separator (W/A) 1 according to the Embodiment 1 of implementation of the invention has a cooling medium flow path 4 provided on the side 1a thereof. A cooling water inlet manifold 5 through which cooling water is supplied into the cooling medium flow path 4 and a cooling water outlet manifold 6 through which cooling water is discharged are formed around the cooling medium flow path 4 and along the edge of the separator (W/A) 1. The cooling water inlet manifold 5 and the cooling water outlet manifold 6 are disposed substantially symmetrically about the center of the separator (W/A) 1, which is substantially square, with each other. The periphery of the separator (W/A) 1 at which the cooling water inlet manifold 5 is provided is designated as "edge 1c". The periphery of the separator (W/A) 1 at which the cooling water outlet manifold 6 is formed is designated as "edge 1d". The side of the separator (W/A) 1 free of edges 1c and 1d is designated as "edge 1e".

The cooling medium flow path 4 has six cooling medium flow path grooves which are parallel to each other and has a zigzag configuration. The cooling medium flow path 4 extends from the cooling water inlet manifold 5 to the edge 1d in parallel to the edge 1e. The cooling medium flow path 4 changes its flowing direction before reaching the edge 1d to turn back toward the edge 1c, forming a cooling medium flow path 4 in parallel to the edge 1e. The cooling medium flow path 4 then changes its flowing direction before reaching the edge 1c to turn back toward the edge 1d. Thus, a cooling medium flow path 4 is formed from the cooling water inlet manifold 5 to the cooling water outlet manifold 6 to make a zigzag configuration.

The cooling medium flow path 4 extends from the edge 1c to the edge 1d, and then turns back toward the edge 1c. Accordingly, as shown in the enlarged view T, among the six cooling medium flow path grooves, the groove 4a on the end of the returning side is disposed adjacent to the groove of the cooling medium flow path 4 itself. In other words, the groove 4a on the end of the returning side is adjacent to the groove the flowing direction of cooling water of which is the same as that of the groove 4a and the groove the flowing direction of cooling water of which is different from that of the groove 4a. The cooling medium flow path 4 has four such returning portions.

The separator (W/A) 1 has a fuel gas inlet manifold 7, a fuel gas outlet manifold 8, an oxidizing gas inlet manifold 9 and an oxidizing gas outlet manifold 10 formed around the cooling medium flow path 4. These inlet and outlet manifolds are disposed symmetrically about the center of the square and along the edge of the separator (W/A) 1 similarly to the manifolds described above.

As shown in FIG. 1B, the separator (W/A) 1 has a fuel gas flow path 11 provided on the surface 1b thereof opposite the cooling medium flow path 4. The fuel gas flow path 11 has two parallel fuel gas flow path grooves and has a zigzag configuration similarly to the cooling medium flow path 4. The fuel gas flow path 11 has two flow path grooves and thus makes 14 turns.

As shown in FIG. 1A, the cooling medium flow path 4 has molding material injection gate marks 12 formed thereon. In some detail, the molding material injection gate mark 12 is a site where no flow path groove is formed between the cooling water inlet manifold 5 and the cooling water outlet manifold 6. In FIG. 1A, three molding material injection gate marks 12 are shown formed. The molding material injection gate mark 12 is a gate mark produced during injection molding in the production of the separator (W/A) 1. One of the three molding material injection gate marks 12 is disposed at the center of the square of the separator (W/A) 1 and the other two are disposed symmetrically about the former gate mark with each other. The molding material injection gate marks 12 are disposed on the cooling medium flow path 4 and extends over three of the six parallel flow path grooves. The flowing direction of cooling water of the three flow path grooves are the same as each other. As shown in the enlarged view T, no molding material injection gate marks 12 are formed on the six flow path grooves the flowing direction of cooling water of which are the same as each other rather than on the portion where the flowing direction of cooling water of one flow path groove is opposite that of another flow path groove due to turning.

Figure 2A:
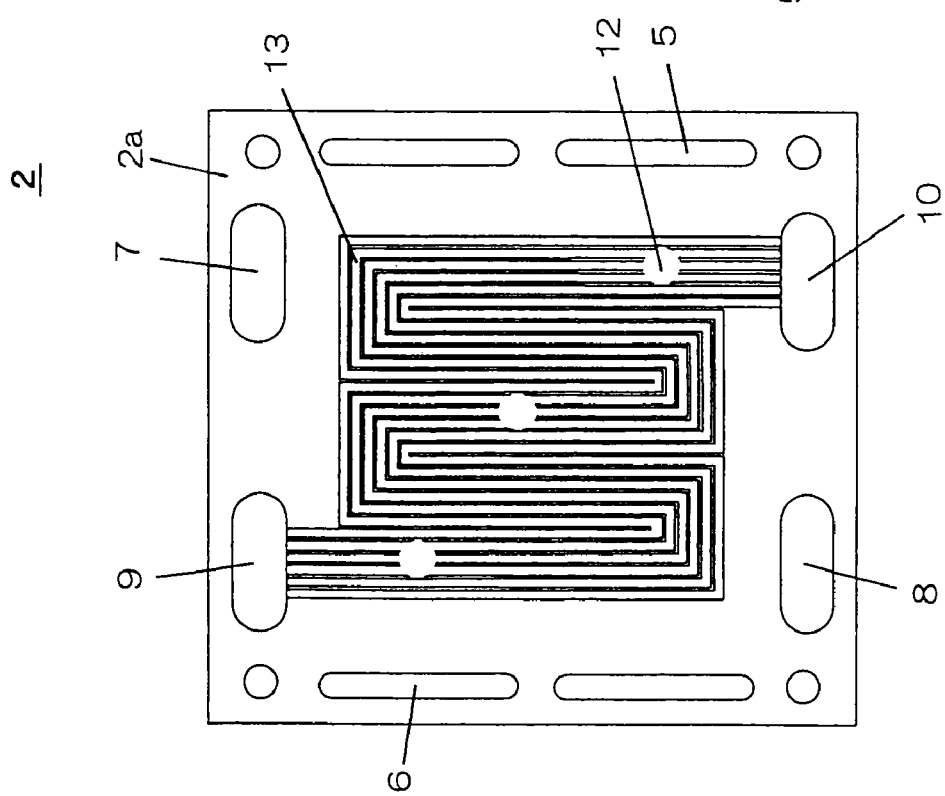
FIG. 2A is a plan view of the edge 2a of a separator (C/W) according to the Embodiment 1 of implementation of the invention on which an oxidizing gas flow path is formed.

FIG. 2A is a plan view of the edge 2a of a separator (C/W) 2 on which an oxidizing gas flow path 13 is formed. FIG. 2B is a plan view of the edge 2b of the separator (C/W) 2 on which a cooling medium flow path 4 is formed. As shown in FIG. 2A, the separator (C/W) 2 has an oxidizing gas flow path 13 provided on the surface 2a thereof. The oxidizing gas flow path 13 has six flow path grooves and has the same zigzag configuration as the cooling medium flow path 4. The separator (C/W) 2 has a cooling medium flow path 4 provided on the surface 2b thereof opposite the surface 2a on which the oxidizing gas flow path 13 is formed.

The separator (C/W) 2 has three molding material injection gate marks 12 similarly to the case mentioned above. One of the three molding material injection gate marks 12 is disposed substantially at the center of the square of the separator (C/W) 2 and the other two are disposed symmetrically about the former gate mark 12 with each other. The molding material injection gate marks 12 are disposed on the oxidizing gas flow path 13 and extends over three of the six parallel flow path grooves. The flowing direction of oxidizing gas of the three flow path grooves are the same with each other.

The separator (W/A) 2 has various inlet and outlet manifolds formed therein similarly to the separator (W/A) 1.

FIG. 3A is a plan view of the side 3a of a separator (C/A) 3 on which an oxidizing gas flow path 13 is formed. FIG. 3B is a plan view of the side 3b of the separator (C/A) 3 on which a fuel gas flow path 11 is formed. As shown in FIG. 3A, the separator (C/A) 3 has an oxidizing gas flow path 13 provided on the surface 3a thereof. The separator (C/A) 3 also has a fuel gas flow path 11 provided on the surface 3b thereof opposite the surface 3a. The separator (C/A) 3 has a molding material injection gate marks 12 disposed at three sites on the surface 3a on which the oxidizing gas flow path 13 is formed similarly to the separator (C/W) 2. The separator (C/A) 3 further has various inlet and outlet manifolds formed therein similarly to the separator (W/A) 1.

A mold for fuel cell separator of producing the aforementioned three separators according to the Embodiment 1 of implementation of the invention will be described below.

Figure 4:
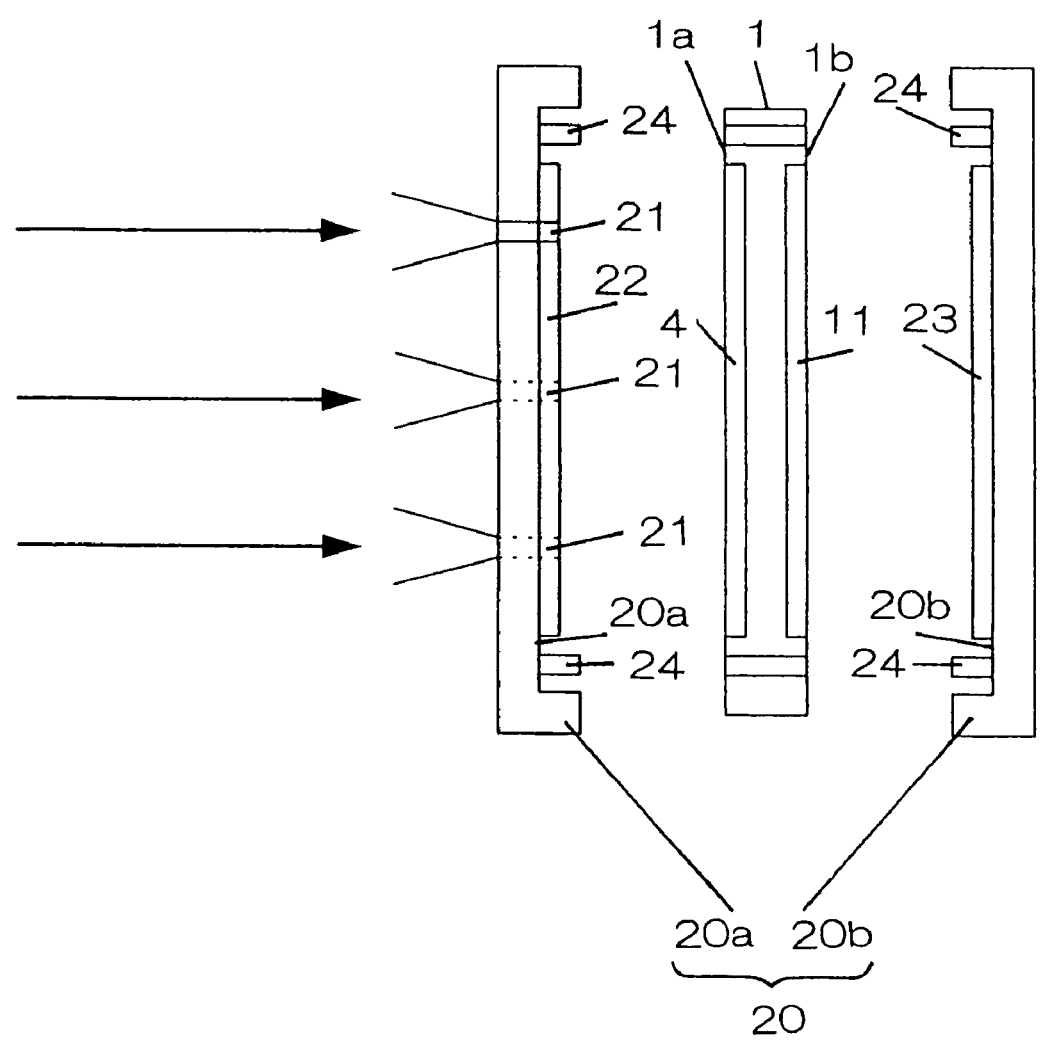
FIG. 4 is a side view of a mold for fuel cell separator (C/A) according to the Embodiment 1 of implementation of the invention and a fuel cell separator (W/A).

FIG. 4 is a side view of a separator (W/A) 1 according to the Embodiment 1 of implementation of the invention and a mold for use in the production thereof.

As shown in FIG. 4, the mold 20 for fuel cell separator according to the Embodiment 1 of implementation of the invention comprises a mold portion 20a which is a portion of forming the surface 1a and an example of the mold of the invention and a mold portion 20b which is a portion of forming the surface 1b and another example of the mold of the invention. The mold portion 20a has three molding material injection gates 21 through which an injection molding material is injected.

Figure 5A:
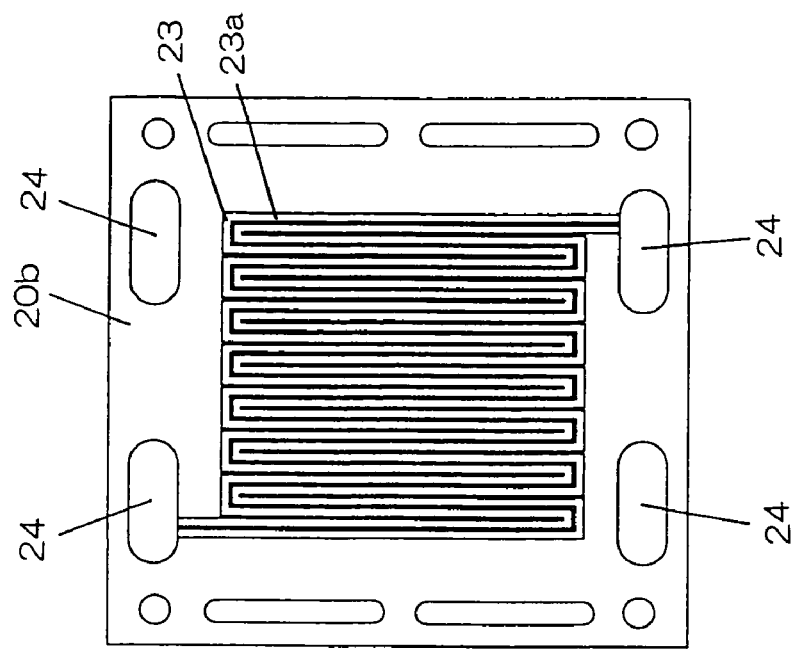
FIG. 5A is a plan view of the cooling medium flow path forming portion of a mold for fuel cell separator (C/A) according to the Embodiment 1 of implementation of the invention.
Figure 5B:
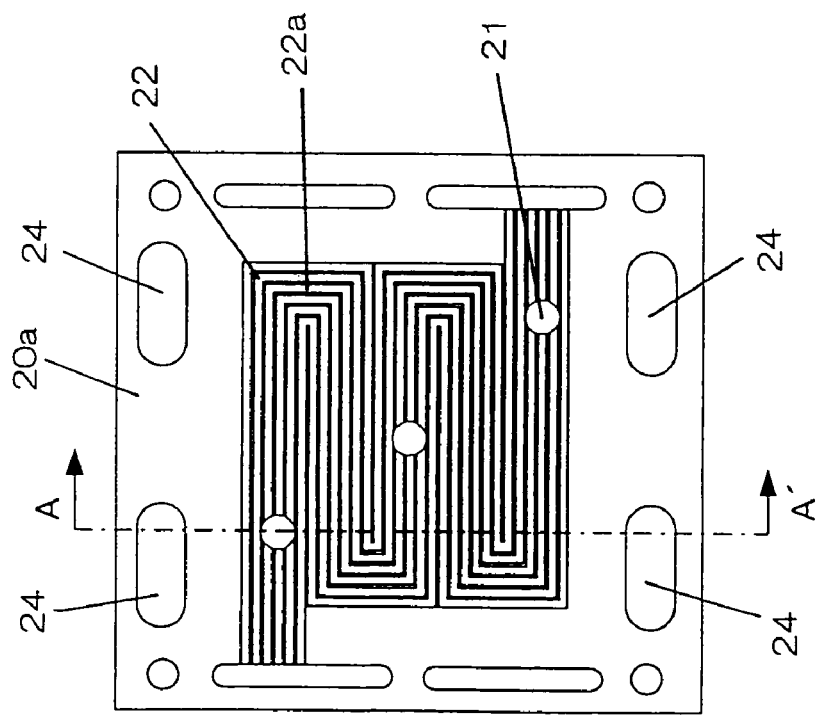
FIG. 5B is a plan view of the oxidizing gas flow path forming portion of a mold for fuel cell separator (C/A) according to the Embodiment 1 of implementation of the invention.

FIG. 5A is a plan view of the mold portion 20a. FIG. 5B is a plan view of the mold 20b. The mold portion 20a shown in FIG. 5A has a cooling medium flow path forming portion 22. The cooling medium flow path forming portion 22 has a flow path raised portion 22a corresponding to the six parallel grooves of the cooling medium flow path 4 having the aforementioned configuration formed on the surface 1a. A molding material injection gate 21 is formed at a position corresponding to the molding material injection gate marks 12 of the separator (W/A) 1. As mentioned above, the opening of the molding material injection gate 21 is disposed on the cooling medium flow path forming portion 22 of the mold portion 20a so that the molding material injection gate marks 12 are formed on the cooling medium flow path 4. Thus, no cooling medium flow path forming portion 22 is formed on the opening of the molding material injection gate 21. Accordingly, molding material injection gate marks 12 are left on the surface 1a of the separator (W/A) 1. The molding material injection gate marks 12 each are a fallen portion having the same depth as that of the groove of the cooling medium flow path 4. FIG. 4 corresponds to the section taken on the line A-A' of FIG. 5.

As shown in FIG. 5B, the mold portion 20b is provided with a fuel gas flow path forming portion 23. The fuel gas flow path forming portion 23 has a flow path groove raised portion 23a corresponding to the groove of the fuel gas flow path 11 having the aforementioned configuration formed on the surface 1b. While the mold portions 20a and 20b each have raised manifold forming portions 24 formed therein corresponding to the various manifolds of the separator (W/A) 1, the invention is not limited thereto. In other words, one of the mold portions 20a and 20b may have a forming portion provided thereon having a height great enough to reach the other so that holes for manifold can be formed in the separator (W/A) 1.

The molding material injection gate 21 may be provided in the vicinity of the flow path forming portion. In the case where the molding material injection gate 21 is provided in the vicinity of the flow path forming portion, the flow path portion can be fairly filled with the injection molding material during injection molding as compared with the case where the molding material injection gate 21 is provided at the edge. However, when the molding material injection gate 21 is provided on the flow path forming portion as in the Embodiment 1 of implementation of the invention, the distance of filling required during injection molding can be reduced to greater advantage from the standpoint of filling of the flow path portion during injection molding.

The mold for the separator (C/W) 2 and the mold for the separator (C/A) 3, too, have a flow path forming portion formed therein. This flow path forming portion has a flow path groove raised portion corresponding to the groove of the various flow paths as in the aforementioned case. These molds each have molding material injection gates 21 formed therein corresponding to the respective molding material injection gate marks 12.

Figure 6:
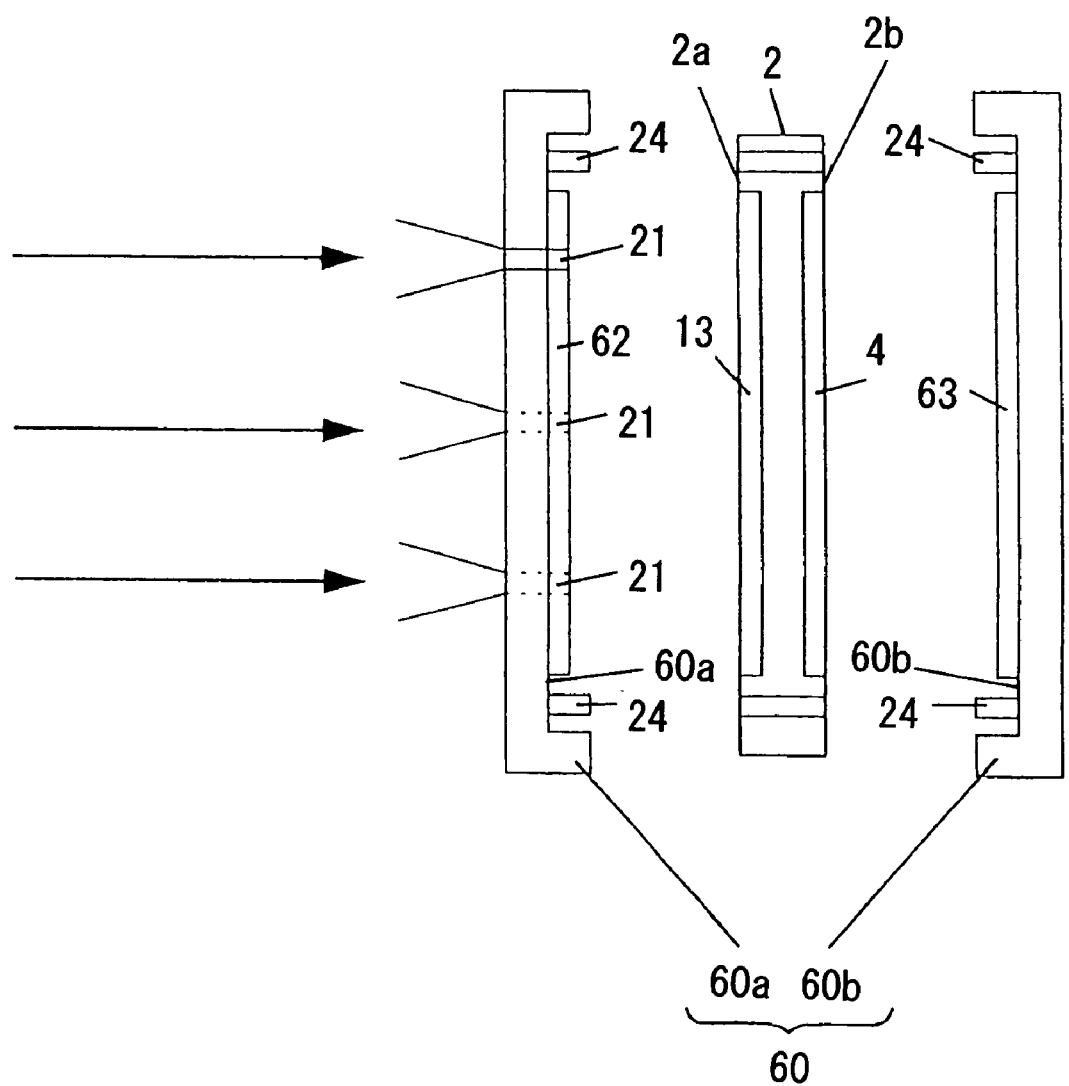
FIG. 6 is a side view of a mold for fuel cell separator (C/A) according to the Embodiment 1 of implementation of the invention and a fuel cell separator (W/A).

In other words, FIG. 6 is a side view of the separator (C/W) 2 according to the Embodiment 1 of implementation of the invention and a mold for use in the production thereof.

As shown in FIG. 6, the mold 60 for the separator (C/W) 2 according to the Embodiment 1 of implementation of the invention comprises a mold portion 60a which is a portion of forming the surface 2a and an example of the mold of the invention and a mold portion 60b which is a portion of forming the surface 2b and another example of the mold of the invention. The mold portion 60a has three molding material injection gates 21 formed therein through which the injection molding material is injected.

Figure 7A:
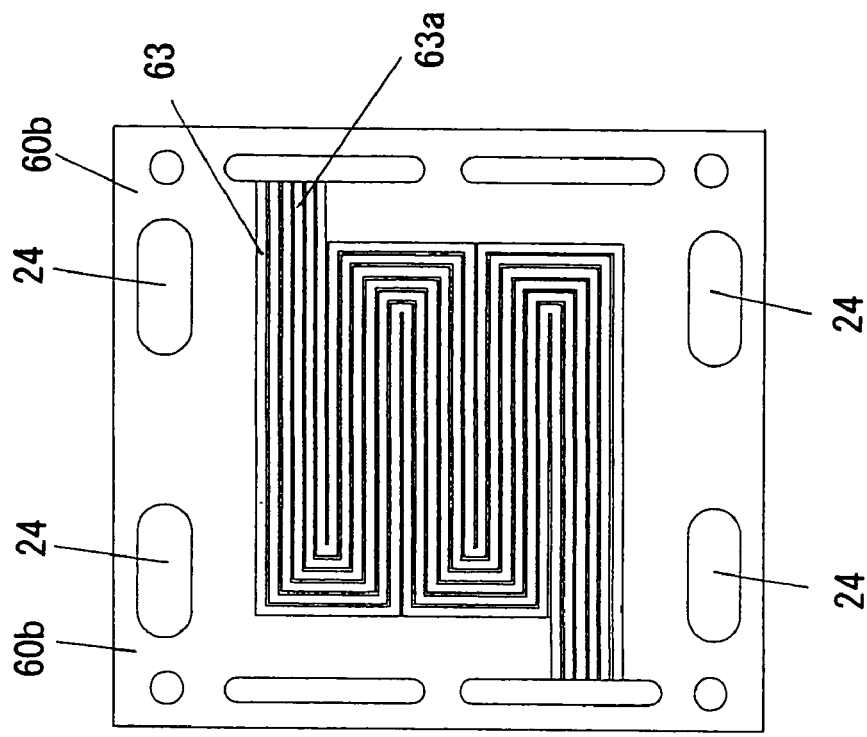
FIG. 7A is a plan view of the oxidizing gas flow path forming portion of a mold for fuel cell separator (C/A) according to the Embodiment 1 of implementation of the invention.
Figure 7B:
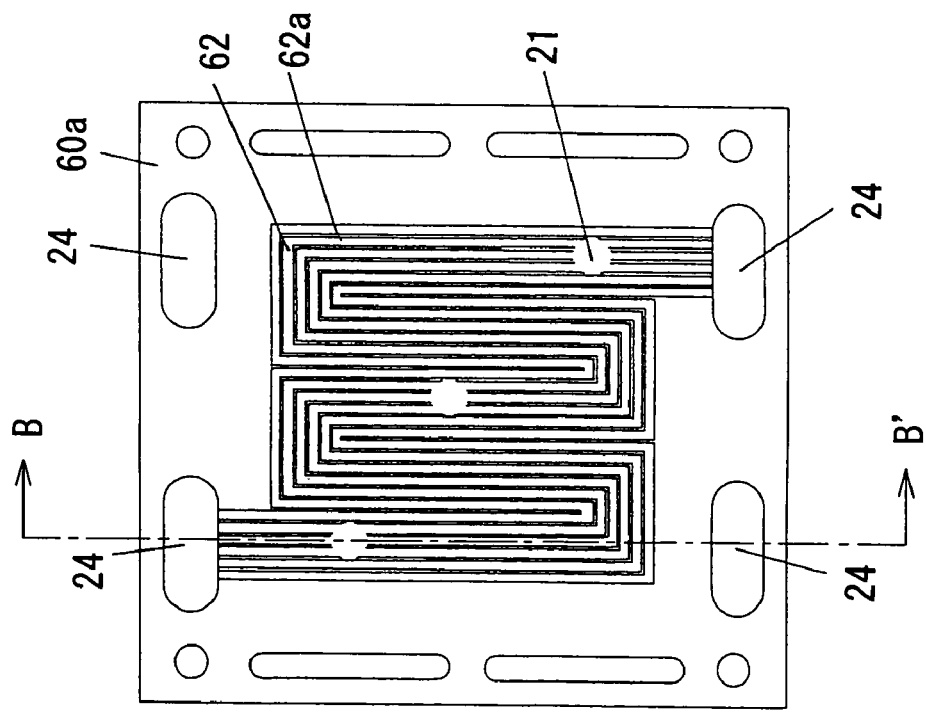
FIG. 7B is a plan view of the cooling medium flow path forming portion of a mold for fuel cell separator (C/A) according to the Embodiment 1 of implementation of the invention.

FIG. 7A is a plan view of the mold portion 60a. FIG. 7B is a plan view of the mold portion 60b. As shown in FIG. 7A, the mold portion 60a is provided with an oxidizing gas flow path forming portion 62. The oxidizing gas flow path forming portion 62 has a flow path groove raised portion 62a corresponding to the six parallel grooves of the oxidizing gas flow path 13 having the aforementioned configuration formed on the surface 2a. A molding material injection gate 21 is formed at positions corresponding to the respective molding material injection gate marks 12 of the separator (C/W) 2. As mentioned above, the opening of the molding material injection gates 21 are disposed in the oxidizing gas flow path forming portion 62 of the mold portion 60a so that the molding material injection gate marks 12 are formed on the oxidizing gas flow path 13. Therefore, no oxidizing gas flow path forming portion 62 is formed in the opening of the molding material injection gates 21. Accordingly, molding material injection gate marks 12 are left on the surface 2a of the separator (C/W) 2. The molding material injection gate marks 12 each are a fallen portion having the same depth as that of the oxidizing gas flow path 13. FIG. 6 corresponds to the sectional view taken on the line B-B' of FIG. 7.

As shown in FIG. 7B, the mold portion 60b is provided with a cooling medium flow path forming portion 63. The cooling medium flow path forming portion 63 has a flow path groove raised portion 63a corresponding to the groove of the cooling medium flow path 4 having the aforementioned configuration formed on the surface 2b. While the mold portions 60a and 60b each have raised manifold forming portions 24 formed therein corresponding to the various manifolds of the separator (C/W) 2, the invention is not limited thereto. One of the mold portions 60a and 60b may have a forming portion provided thereon having a height great enough to reach the other so that holes for manifold can be formed in the separator (C/W) 2.

Figure 8:
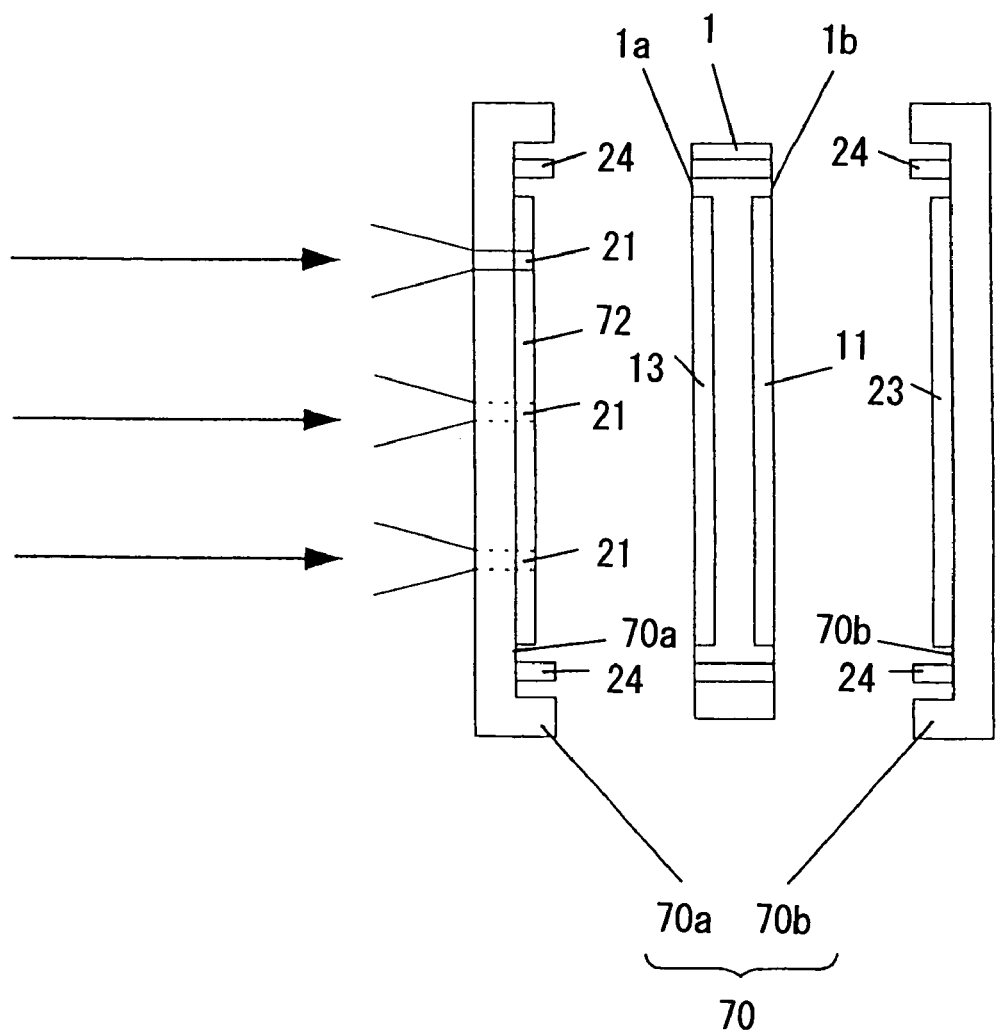
FIG. 8 is a side view of a mold for fuel cell separator (C/A) according to the Embodiment 1 of implementation of the invention and a fuel cell separator (W/A).

FIG. 8 is a side view of the separator (C/A) 3 according to the Embodiment 1 of implementation of the invention and a mold for use in the production thereof.

As shown in FIG. 8, the mold 70 for the separator (C/A) 3 according to the Embodiment 1 of implementation of the invention comprises a mold portion 70a which is a portion of forming the surface 3a and an example of the mold of the invention and a mold portion 70b which is a portion of forming the surface 3b and another example of the mold of the invention. The mold portion 70a has three molding material injection gates 21 through which an injection molding material is injected.

Figure 9A:
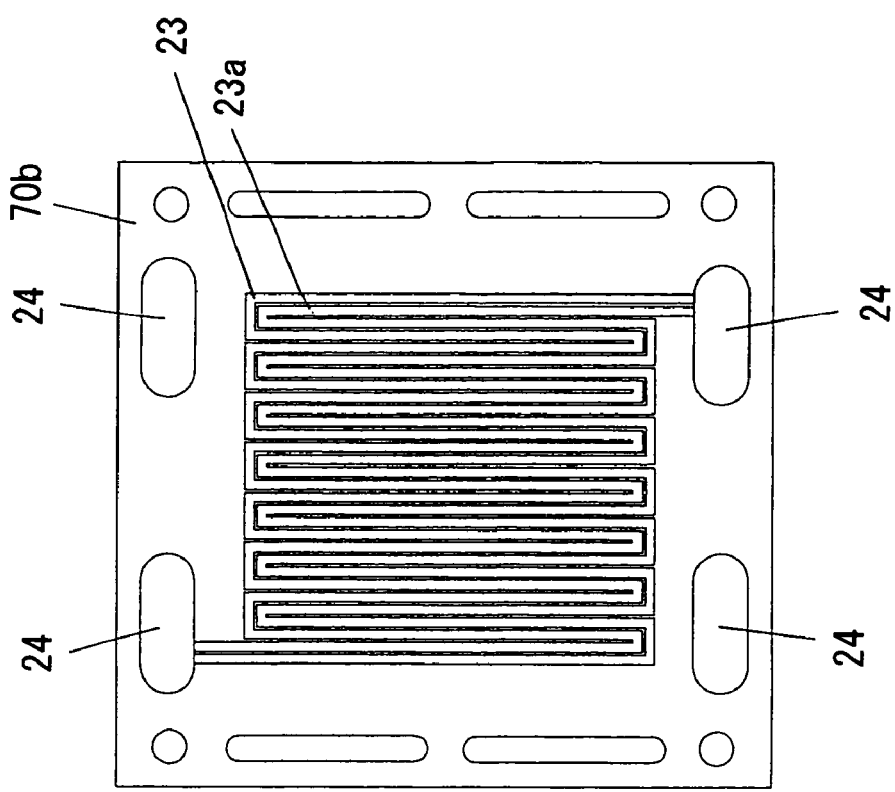
FIG. 9A is a plan view of the oxidizing gas flow path forming portion of a mold for fuel cell separator (C/A) according to the Embodiment 1 of implementation of the invention.
Figure 9B:
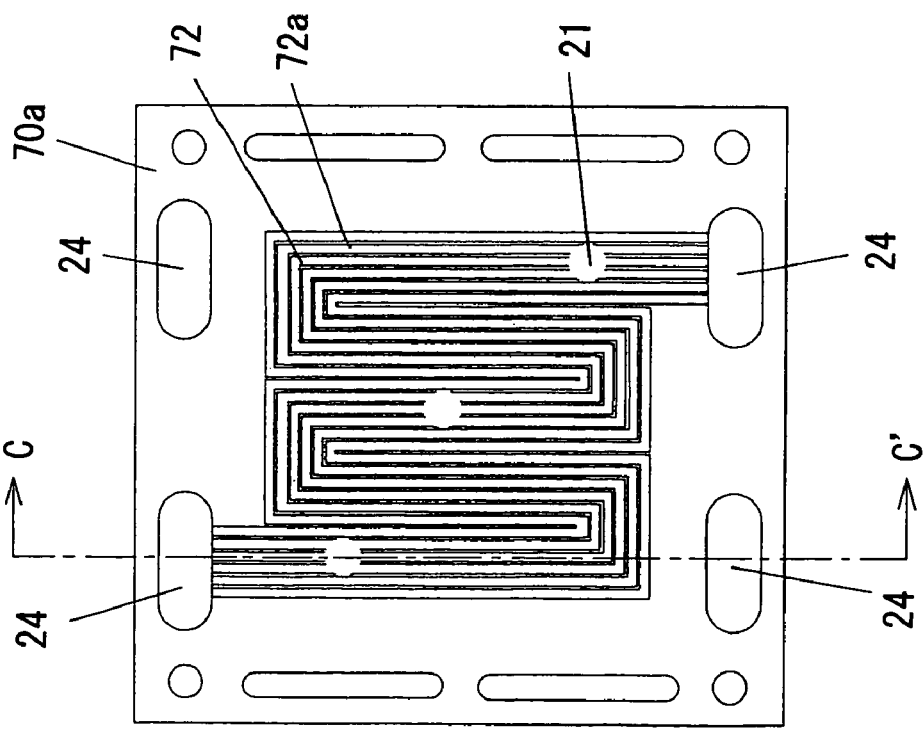
FIG. 9B is a plan view of the fuel gas flow path forming portion of a mold for fuel cell separator (C/A) according to the Embodiment 1 of implementation of the invention.

FIG. 9A is a plan view of the mold portion 70a. FIG. 9B is a plan view of the mold portion 70b. As shown in FIG. 9A, the mold portion 70a is provided with an oxidizing gas flow path forming portion 72. The oxidizing gas flow path forming portion 72 has a flow path groove raised portion 72a corresponding to the six parallel grooves of the oxidizing gas flow path 13 having the aforementioned configuration formed on the surface 3a. A molding material injection gate 21 is formed at positions corresponding to the respective molding material injection gate marks 12 of the separator (C/A) 3. As mentioned above, the opening of the molding material injection gates 21 are disposed in the oxidizing gas flow path forming portion 72 of the mold portion 70a so that the molding material injection gate marks 12 are formed on the oxidizing gas flow path 13. Therefore, no oxidizing gas flow path forming portion 72 is formed in the opening of the molding material injection gates 21. Accordingly, molding material injection gate marks 12 are left on the surface 3a of the separator (C/A) 3. The molding material injection gate marks 12 each are a fallen portion having the same depth as that of the oxidizing gas flow path 13. FIG. 8 corresponds to the sectional view taken on the line C-C' of FIG. 9A.

As shown in FIG. 9B, the mold portion 70b is provided with a fuel gas flow path forming portion 23. The fuel gas flow path forming portion 23 has a flow path groove raised portion 23a corresponding to the groove of the fuel gas flow path 11 having the aforementioned configuration formed on the surface 3b. While the mold portions 70a and 70b each have raised manifold forming portions 24 formed therein corresponding to the various manifolds of the separator (C/A) 3, the invention is not limited thereto. One of the mold portions 70a and 70b may have a forming portion provided thereon having a height great enough to reach the other so that holes for manifold can be formed in the separator (C/A) 3.

In general, a fuel cell separator has a flow path configuration through which a fuel gas, an oxidizing gas or a cooling water flows as an important constituent governing the cell performance. In the case where electricity is generated with MEA interposed between separators, it is necessary that the pitch between the flow paths in the aforementioned flow path configuration be reduced to prevent MEA from hanging down into the flow path so that the fuel gas or oxidizing gas is allowed to flow stably to the periphery of MEA because MEA itself has a relatively small rigidity. Accordingly, the pitch between the flow paths formed on the separator is reduced more.

On the other hand, the production of the separator by injection molding has an assignment of how the material should be injected into the mold. The material to be used in injection molding has a great thermal conductivity and thus cools quickly and hence exhibits an extremely poor moldability. Therefore, the gate through which the material is injected should be normally as large as possible to advantage. Accordingly, in order to increase the size of the gate for injection of material, a mold having a film gate or the like formed therein in the direction perpendicular (lateral direction) to the flow path of the separator is used.

However, in the case where the flow path configuration characteristic to fuel cell separator is formed at substantially the center of the separator, when the molten material passes through the site in the mold corresponding to the flow path configuration of the separator, the site has a great flow path resistivity and a great surface area with which the material comes in contact. Accordingly, the site causes a great heat dissipation, making it impossible to fill the mold with the material.

In order to reduce the flow path resistivity, the thickness of the separator was reduced. However, the surface area of the site in the mold corresponding to the flow path configuration of the separator remained the same. As a result, this site caused a great heat dissipation, leaving the moldability of the flow path portion of the separator something to be desired. Further, the resulting separator had a great thickness. Therefore, the fuel cell comprising this separator, too, was large and could not be marketed.

Further, during the injection molding, there were produced a filling flow path along which the material passes through the site in the mold corresponding to the flow path forming site of the separator and a filling flow path along which the material passes through the site other than the site in the mold corresponding to the flow path forming site of the separator. Therefore, the time required for the material to fill the filling flow path through which the material can difficultly flow was prolonged, increasing the time required for injection molding. Further, the production of the two filling flow paths made the heat dissipation of the material being packed ill-balanced, reducing the strength of weld portion and causing the occurrence of underfilling due to catching of gas. As a result, worsening of surface roughness and dimensional defects were caused.

In order to assure the moldability of the flow path forming site, a molten material having a high temperature and a low viscosity was used and an injection site was provided at the flow path forming portion or in the vicinity thereof. Further, the shape of the gate through which the material is injected was devised smaller, minimizing the change relative to the flow path forming portion.

As a result, the flow path resistivity received by the material flowing from the gate to the periphery of the mold during injection molding was made uniform over all directions. Therefore, the filling of the interior of the separator mold with the material was made uniform, reducing the molding time. Further, the distance over which the material flows is made uniform over all directions, making the radiating surface area with respect to the material thus packed uniform. Further, since the gate portion is disposed in the vicinity of the center of the flow path forming portion, a molten material in the most flowable state (having a low viscosity) is injected into the flow path forming portion having the highest flow path resistivity. Accordingly, the flow path resistivity against the molten material during the passage through the flow path forming portion can be reduced. Further, the injection pressure of the molten material can be sufficiently transmitted. Accordingly, this arrangement is suitable for the improvement of the moldability of the material in the mold (less surface roughness, higher strength of weld portion, higher packing of material), breathing properties, and dimensional accuracy. It was further made obvious that the sites other than the flow path forming portion can be sufficiently molded even with the molten material which has passed through the flow path forming portion because they have a simple shape as compared with the flow path forming portion.

Moreover, the reduction of the flow path resistivity eliminates the necessity of a special molding machine capable of molding a material at high pressure, making it possible to reduce facility investment. This also results in an effect of reducing cost. Further, in the case where there are facilities capable of molding a material at high pressure, when the pressure at which the material is extruded remains the same, the time required for material to fill the mold can be reduced to reduce the molding cycle because the flow path resistivity is reduced. This makes it possible to enhance productivity and reduce cost.

Further, a fuel cell is normally formed by laminating single cells to obtain a required output. Therefore, a combination of separator shaving an oxidizing gas flow path, a fuel gas flow path and a cooling medium flow path formed on the surface thereof in contact with MEA and no flow paths formed on the other surface thereof is needed. It was made obvious that when a mold arranged to obtain the aforementioned effect on moldability is provided with flow paths to be formed on the other surface of the separator, an efficient mold giving a high productivity can be obtained.

The molding material injection gate was devised to have a width corresponding to that of one raised portion of the flow path forming portion so that the change of the flow path forming portion is minimized. However, the opening for material injection was reduced, limiting the shape of the separator allowable for moldability. In order to avoid this difficultly, a molding material injection gate extending over a plurality of raised portions was provided. It was made obvious that this arrangement makes it possible to obtain a large opening area for material injection and a good moldability that cannot be governed by the shape of the separator.

Flow paths formed in the fuel cell separator are normally arranged such that a plurality of flow paths extend from the inlet manifold to the outlet manifold in parallel to each other and are communicated to each other to give a proper pressure loss to the separator. There is a case where a plurality of parallel flow paths make turns on the plane of the separator to form a flowpath so that the pressure loss can be kept at an optimum value. In the case where the molding material injection gate extending over a plurality of raised portions is provided extending over a site where the flowing direction of a plurality of flow path grooves are not the same with each other, the fluid which should flow while making turns according to the original route makes turns at the gate and thus cannot flow the desired site. This configuration causes the deterioration of the electricity-generating performance or efficiency of the cell because the flow operation range of the fuel cell system deviates from the defined range, making it impossible to assure a required pressure loss. It was thus made obvious that the molding material injection gate is preferably provided on the aforementioned flow path forming portion where the flowing direction of a plurality of flow path grooves are the same with each other.

Moreover, when the molding material injection gate is positioned in the vicinity of the center of the aforementioned flow path forming portion extending from the inlet to the outlet of the flow path molded by the aforementioned flow path forming portion, the flow path resistivity and radiating surface area of the material flowing through the flow path forming portion can be made uniform. It was thus made obvious that this arrangement is suitable for the improvement of the moldability of the separator.

In order to adapt itself to a pressure loss optimum for the flowing fluid, the flow path formed in the separator changes by the fluid. In general, a fuel gas flow path requires less parallel flow paths having the same flowing direction to predetermine an optimum pressure loss because a small amount of a fuel gas flow rate is required for electricity generation. Therefore, there occurs a case where a space required for the arrangement of the molding material injection gate cannot be obtained. It was thus made obvious that the molding material injection gate is preferably provided on the oxidizing gas flow path forming portion or cooling medium flow path forming portion. This is because the oxidizing gas flow path or cooling medium flow path allows the flow of a fluid at a relatively high rate and thus has more parallel flow paths having the same flowing direction required for the predetermination of an optimum pressure loss, making it more easy to obtain a space required for the formation of the molding material injection gate.

Further, when injection molding is effected through the molding material injection gate, the mold precision can be accurately transferred to the injection molding material, making it possible to obtain a desired dimensional accuracy. Moreover, the production time per sheet of separator can be reduced, making it possible to enhance productivity. It was thus made obvious that this arrangement allows cost reduction, enhancement of reliability and maintenance of stable cell performance.

Moreover, the separator is required to have a high electrical conductivity, a high dimensional stability, a high mechanical strength, a high heat resistance and a cleanness high enough to give no impurities to the cell. To this end, the molding material to be used may comprise an electrically-conductive filler dispersed in a binder resin to form a material entangled with the electrically-conductive filler, making it possible to realize a high electrical conductivity. Further, as the binder resin there can be selected a proper material from the standpoint of heat resistance and cleanness. Thus, a material mixed with a binder resin selected depending on the operating temperature range and the purpose of the fuel cell can be used. It was thus made obvious that the material can be selected depending on the purpose of the separator, making it possible to drastically reduce cost.

The fuel cell separator prepared according to the aforementioned method and the fuel cell formed by laminating the separator have the same electrical conductivity, mechanical strength, heat resistance, cleanness and part precision as that of separator formed by cutting isotropic graphite. Further, the separator according to the present embodiment has higher toughness and hence better impact resistance than separator formed by cutting isotropic graphite. Moreover, since the separator according to the present embodiment can be produced by injection molding, the necessity of machining can be eliminated. It was thus made obvious that the use of the separator according to the present embodiment makes it possible to drastically reduce cost and enhance productivity.

The configuration of a fuel cell comprising the separator according to the Embodiment 1 of implementation of the invention will be described below.

Figure 10:
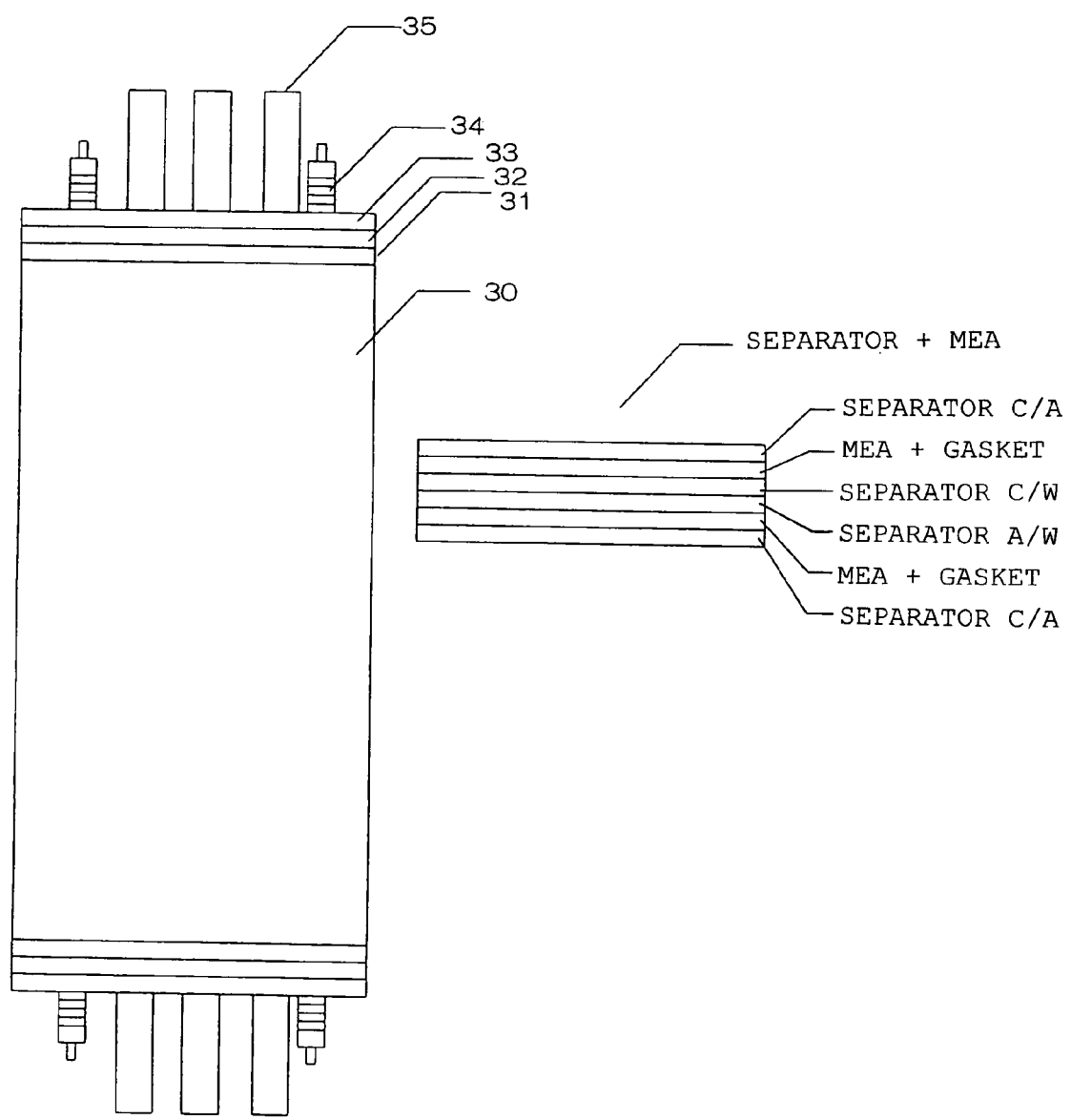
FIG. 10 is a side view of a fuel cell comprising the separator according to the Embodiment 1 of implementation of the invention.

FIG. 10 is a side view of a fuel cell comprising the separator according to the Embodiment 1 of implementation of the invention. As shown in FIG. 10, the fuel cell comprising the separator according to the Embodiment 1 of implementation of the invention comprises a stack 30 having a laminate of single cells. The stack 30 is clamped between end plates 33 with a collector 31 and an insulating plate 32 interposed therebetween. A fastening bolt 34 of fastening these parts is provided extending through various fastening bolt holes. Pipings 35 of supplying a fuel gas, an oxidizing gas and a cooling water into the stack and discharging these gases therefrom are provided for various manifolds formed in the separator.

Figure 11:
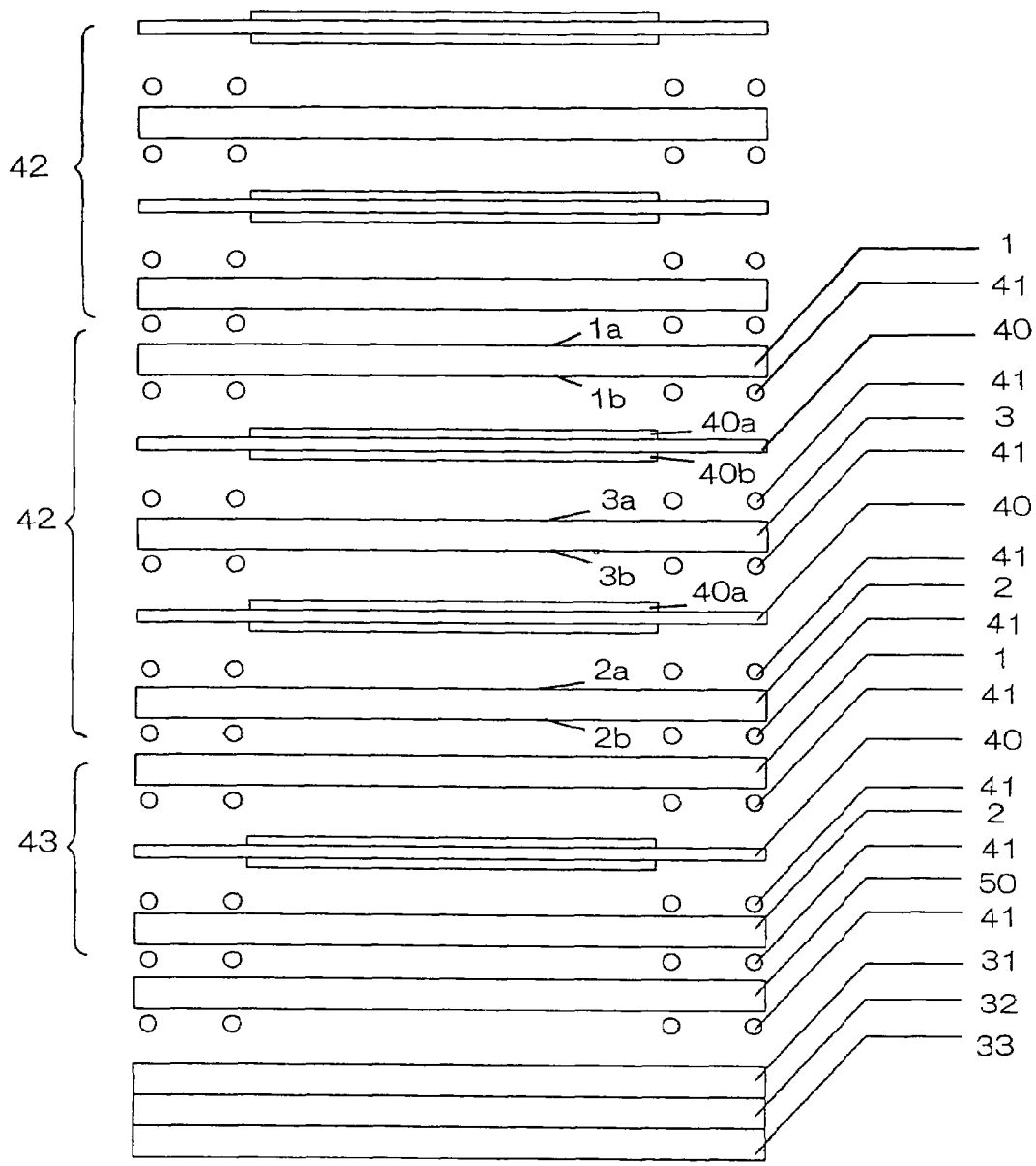
FIG. 11 is a side structural diagram of a stack comprising the fuel cell separator according to the Embodiment 1 of implementation of the invention.

The configuration of a stack 30 comprising the aforementioned three separators will be described hereinafter. FIG. 11 is a side view of the disassembled configuration of the stack 30. As shown in FIG. 11, the stack 30 comprises MEA 40 having a polymer electrolyte membrane, a pair of fuel gas diffusion electrodes 40a disposed on the respective side thereof and an oxidizing gas diffusion electrode 40b. Separators are provided clamping MEA 40 with a gasket 41 interposed therebetween to form an elementary cell. The stack 30 according to the Embodiment 1 of implementation of the invention shown in FIG. 11 has a cooling portion provided for every two single cells through which cooling portion cooling water flows. The assembly of the two single cells is designated as elementary cell 42.

In some detail, supposing that the laminate is arranged such that the surface 1b of the separator (W/A) 1 of the elementary cell 42 faces downward, the fuel gas diffusion electrode 40a of MEA 40 is provided on the lower surface 1b of the separator (W/A) 1 and the upper surface 3a of the separator (C/A) 3 is provided on the side of MEA 40 where the oxidizing gas diffusion electrode 40b is provided. The lower surface of the separator (C/A) 3 is the lower surface 3b having a fuel gas flow path 11 formed thereon. MEA 40 is disposed in such an arrangement that the lower surface 3b comes in contact with the side thereof where the fuel gas diffusion electrode 40a is provided. The upper surface 2a of a separator (C/W) 2 is provided on the side of MEA 40 where the oxidizing gas diffusion electrode 40b is provided.

In other words, the separator 1, MEA 40, the separator 3, MEA 40 and the separator 2 are stuck in this order to form the elementary cell 42. Since these components are stuck in this order with the separator 1 as uppermost layer, the surface of the various separators each are an upper surface while the surface b thereof each are a lower surface. A gasket 41 is provided interposed between these layers. The upper surface of the two single cells 42 each are the upper surface 1a of the separator (W/A) 1 while the lower surface of the two single cells 42 each are the lower surface 2b of the separator (C/W) 2. These upper surface 1a and lower surface 2b each have a cooling medium flow path 4 formed thereon as a cooling portion. During the generation of electricity, cooling is conducted at the cooling portion.

The upper surface 1a of the lower one of the vertically stuck single cells 42 and the lower surface 2b of the upper one of the vertically stuck single cells 42 are disposed opposed to each other with the gasket 41 interposed therebetween. The cooling medium flow path 4 is formed on the upper surface 1a and the lower surface 2b in mirror image relationship such that the cooling medium flow path 4 on the upper surface 1a and the cooling medium flow path 4 on the lower surface 2b are opposed to each other.

The aforementioned single cells 42 are stuck. The laminate has an elementary cell 43 provided on the both upper and lower ends thereof, the elementary cell 43 having a cooling portion provided therein every one elementary cell. The elementary cell 43 comprises MEA 40, a separator 1 provided on the side of MEA 40 where the fuel gas diffusion electrode 40a is provided, a separator 2 provided on the side of MEA 40 where the oxidizing gas diffusion electrode 40b is provided and a gasket 41 provided interposed therebetween. The elementary cell 43, too, is arranged such that the surface a of the various separators each are an upper surface while the surface b of the various separators each are a lower surface.

As mentioned above, the elementary cell 43, the single cells 42 and the elementary cell 43 are stuck in the descending order. The laminate has an end separator provided on both the upper and lower ends thereof.

Figure 12B:
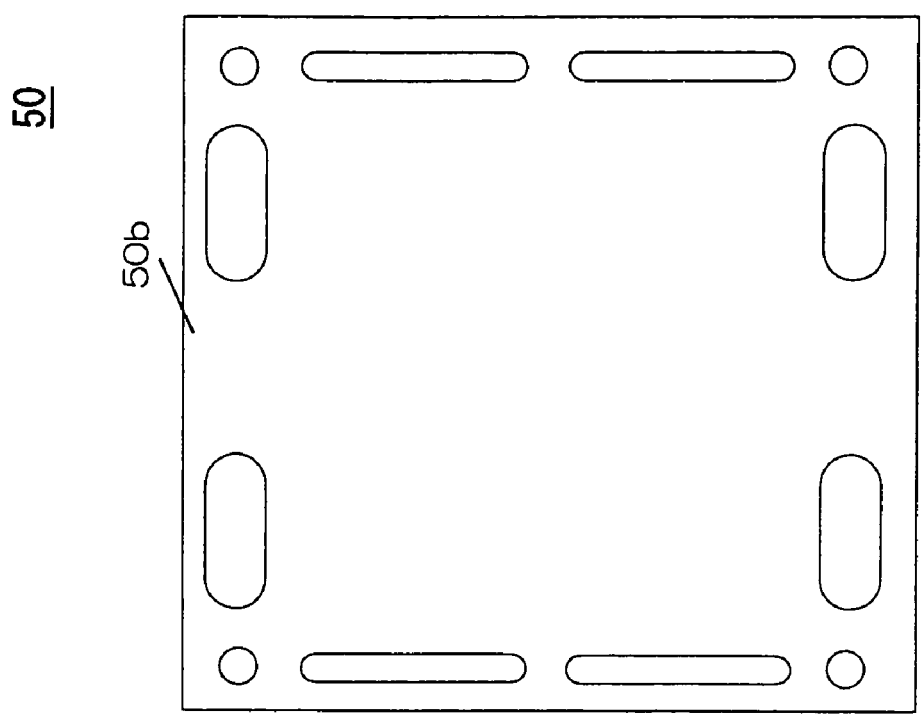
FIG. 12B is a plan view of the side of the end separator (W/B) according to the Embodiment 1 of implementation of the invention on which no flow paths are formed.
Figure 12A:
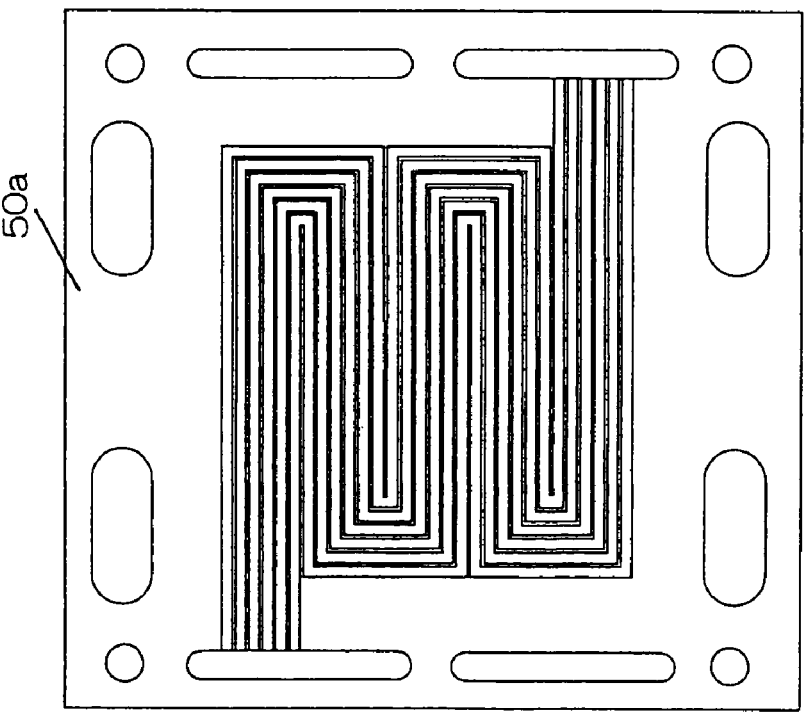
FIG. 12A is a plan view of the side of the end separator (W/B) according to the Embodiment 1 of implementation of the invention on which a cooling medium flow path is formed.

FIG. 12A is a plan view of the side 50a of the end separator (W/B) 50 where a cooling medium flow path 4 is formed. FIG. 12B is a plan view of the side 50b of the end separator (W/B) 50 where no flow paths are formed. As shown in FIG. 12, the end separator (W/B) 50 has the cooling medium flow path 4 formed on one side 50a thereof and no flow paths formed on the other side 50b. As shown in FIG. 11, the end separator (W/B) 50 is disposed at the lower end of the aforementioned laminate of single cells. The surface 50a of the end separator (W/B) 50 is an upper surface which is opposed to the lower surface 2b of the laminate of single cells with a gasket 41 interposed therebetween. The cooling medium flow path 4 on the upper surface 50a of the end separator (W/B) 50 is in mirror image relationship with the cooling medium flow path 4 formed on the surface 2b. The two cooling medium flow paths 4 are formed in such an arrangement that they are opposed to each other when stuck.

Figure 13B:
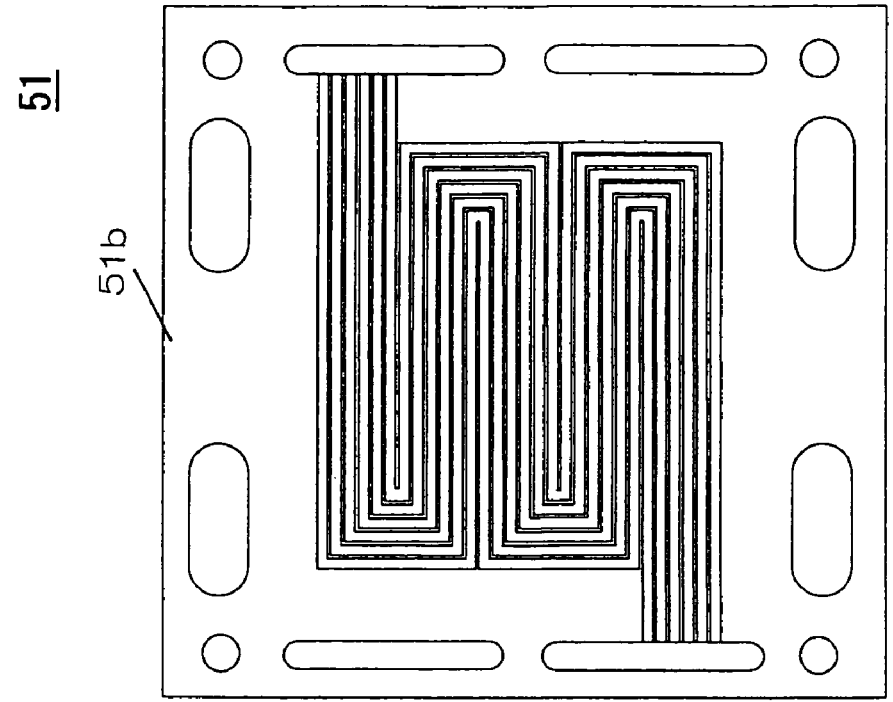
FIG. 13B is a plan view of the side of the end separator (B/W) according to the Embodiment 1 of implementation of the invention on which a cooling medium flow path is formed.
Figure 13A:
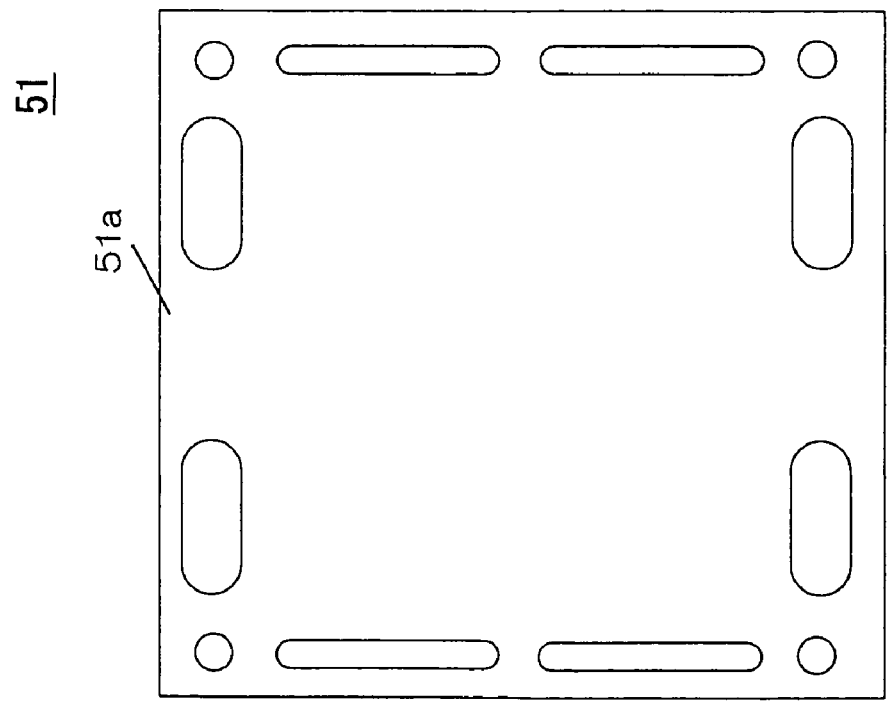
FIG. 13A is a plan view of the side of the end separator (B/W) according to the Embodiment 1 of implementation of the invention on which no flow paths are formed.

FIG. 13A is a plan view of the side 50a of the end separator (B/W) 51 where no flow paths are formed. FIG. 13B is a plan view of the side 51b of the end separator (B/W) 51 where a cooling medium flow path 4 is formed. As shown in FIG. 13, the end separator (B/W) 51 has no flow paths formed on one side 50a thereof and a cooling medium flow path 4 formed on the other side 51b thereof. The end separator (B/W) 51 is disposed on the upper side of the aforementioned laminate of single cells. The surface 51b of the end separator (B/W) 51 is a lower surface which is opposed to the upper surface 1a of the laminate of single cells with a gasket 41 interposed therebetween (not shown). The cooling medium flow path 4 is formed on the lower surface 51b of the end separator (B/W) 51 in mirror image relationship with the cooling medium flow path 4 formed on the surface 1a of the laminate of single cells as in the aforementioned case. The surface 50b and the surface 50a are each opposed to collectors 31 clamping the stack 30 with the gasket 41 interposed therebetween.

Thus, the stack 30 is formed by laminating the end separator (B/W) 51, the elementary cell 43, the single cells 42, the elementary cell 43 and the end separator (W/B) 50 in the descending order.

A method of producing the fuel cell comprising the separator according to the Embodiment 1 of implementation of the invention having the aforementioned configuration will be described hereinafter. An example of the method of producing the separator of the invention will be also described hereinafter.

An acetylene black-based carbon powder having 25% by weight of a particulate platinum having an average particle diameter of about 30 angstrom supported thereon was used as a catalyst for reactive electrode. A solution formed by dispersing the catalyst powder in isopropanol was then mixed with a dispersion formed by dispersing a powder of perfluorocarbonsulfonic acid represented by the following chemical formula 1 in ethyl alcohol to make a paste. As a raw material, the paste thus obtained was then subjected to screen printing to form an electrode catalyst layer on one surface of a nonwoven carbon cloth having a thickness of 250 μm. Adjustment was made such that the content of platinum and perfluorocarbonsulfonic acid in the reactive electrode thus formed are 0.5 mg/cm² and 1.2 mg/cm², respectively.

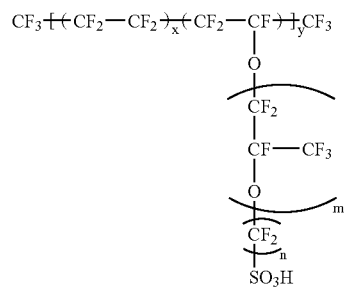

Chemical Formula 1 wherein
$5 \leq x \leq 13.5$
$y \approx 1000$
$m = 1$
$n = 2$

Both the positive electrode and negative electrode have the same configuration. These electrodes were each bonded to the both surfaces of the central part of a protonically-conductive polymer electrolyte membrane having an area larger than that of the electrodes under hot press in such an arrangement that the printed catalyst layer comes in contact with the electrolyte membrane to prepare an electrode/electrolyte assembly (MEA) 40. As the protonically-conductive polymer electrolyte there was used one obtained by forming a perfluorocarbonsulfonic acid represented by the aforementioned general formula 1 into a thin film having a thickness of 25 μm.

A method and an apparatus (injection molding machine) of producing a fuel cell separator by injection molding using the mold for fuel cell separator according to the Embodiment 1 of implementation of the invention will be described hereinafter.

Figure 14:
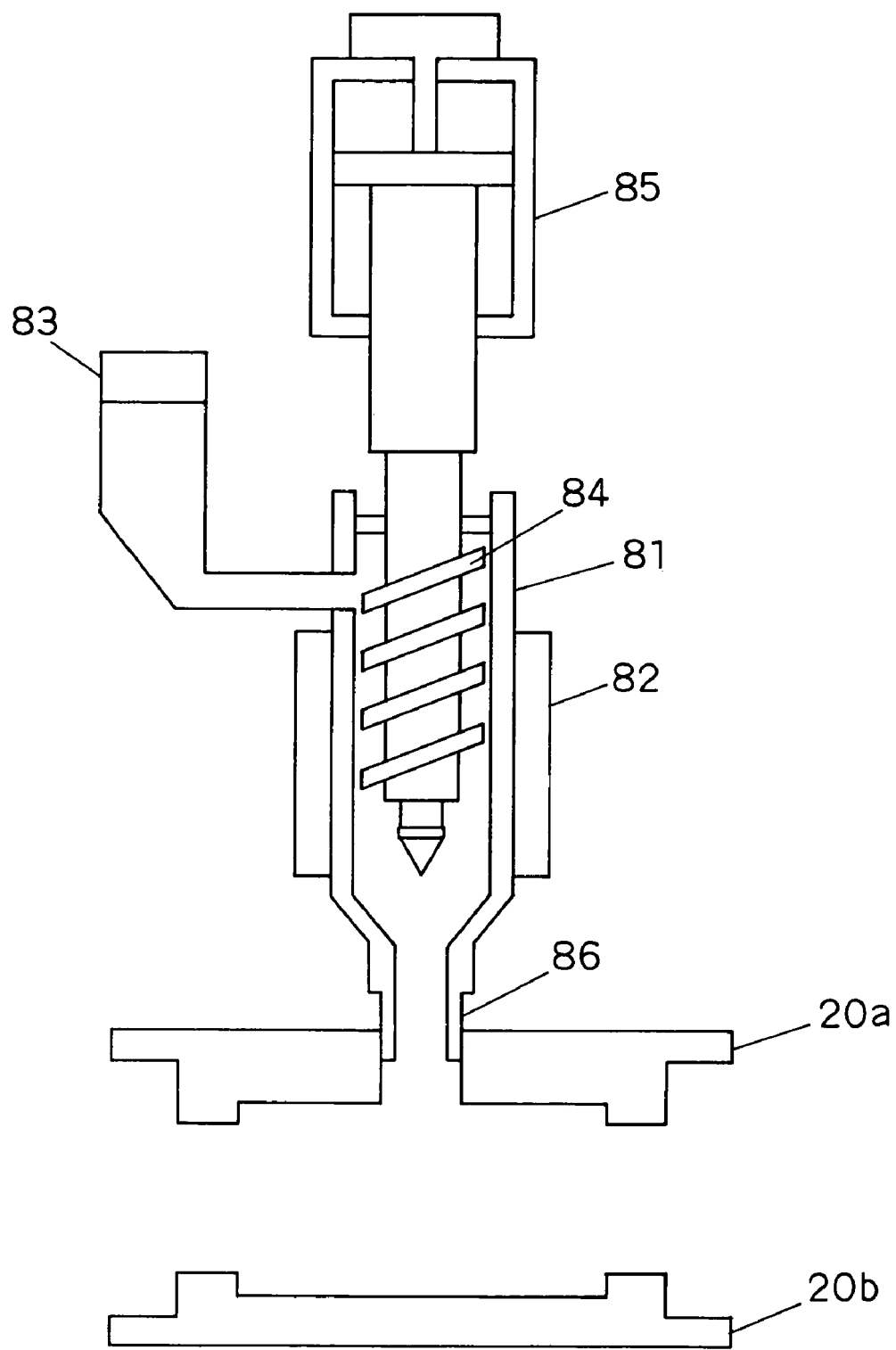
FIG. 14 is a diagram illustrating the configuration of an apparatus (injection molding machine) of producing a fuel cell separator according to the Embodiment 1 of implementation of the invention.

FIG. 14 illustrates a fuel cell separator producing apparatus (injection molding machine) 80 of injection-molding a fuel cell separator using the mold for fuel cell separator according to the Embodiment 1 of implementation of the invention.

In FIG. 14, the fuel cell separator producing apparatus 80 comprises a heating cylinder 81 having a heater 82, a hopper 83, a screw 84, a screw driving mechanism 85 and an injection nozzle 86.

The heating cylinder 81 is a unit of heating and melting the separator material from the hopper 83 by the heater 82.

The hopper 83 is a unit of charging the separator material supplied from a loader (not shown) into the heating cylinder 81.

The screw 84 is a unit of feeding the separator material to the injection nozzle 86 with stirring.

The screw driving mechanism 85 is a unit of hydraulically or electromotively (servo motor) driving the screw 84.

The injection nozzle 86 is a unit of injecting the molten separator material into the mold 20 through the molding material injection gate 21 of the mold 20.

As a compound for electronically-conductive site which is a separator material there was used a 7:3 mixture (by weight) of graphite as an electrically-conductive filler and PPS (polyphenylene sulfide) as a binder resin. The compound was then charged into the injection molding machine 80 comprising the injection nozzle 86 capable of melt-kneading the material. The injection nozzle 86 had a mold 20 provided at the forward end thereof having a separator profile formed therein as shown in FIG. 5. The molding material injection gate 21 through which the molten material is injected into the mold 20 is a multi-point gate comprising a hot runner.

As the material of the mold 20 there is normally used carbon tool steel (SK material) or the like from the standpoint of molding tact and strength. However, since the separator material used in the Embodiment 1 of implementation of the invention has a high thermal conductivity and hence a high curing rate, defective molding occurs. Therefore, as the material of the mold 20 there was used a material having a low thermal conductivity to obtain a desired moldability. A representative example of the material of the mold 20 used is SUS630. The mold temperature was 150° C., the injection nozzle temperature was 350° C., the injection pressure was 1,600 kgf/cm$^2$, the injection rate was 200 mm/sec, and the molding time was 40 seconds.

Using the aforementioned separator material, mold 20 and molding conditions, the injection molding machine 80 is operated in the following manner. In some detail, the separator material is supplied from a loader (not shown) into the hopper 83 from which it then flows into the inlet of the heating cylinder 81.

The screw driving mechanism 85 drives the screw 84. The separator material which has flown into the inlet of the heating cylinder 81 is then fed into the heating cylinder 81 by the rotation of the screw 84 driven by the screw driving mechanism 85.

The heating cylinder 81 is temperature-controlled by the heater 82 provided on the periphery thereof. The separator material is melted by the heat of the heater 82 and the frictional heat developed by the rotation and shearing of the screw 84. The screw 84 moves backward while feeding the molten material into the heating cylinder 81. Once a predetermined amount of the molten material has been accumulated at the forward end of the heating cylinder 81, the screw 84 suspends rotation.

Subsequently, the mold portion 20a and the mold portion 20b were closed and fastened to each other. Thereafter, the screw driving mechanism 85 causes the screw 84 to move forward and press the molten material into the mold 20 through the injection nozzle 86. The screw 84 has a check valve (not shown) provided at the forward end thereof. The check valve allows the molten material to pass forward during the rotation of the screw 84 and stops the backward flow of the molten material during pressing.

Then, in the mold 20, the molten material flows from the molding material injection gate 21 into the space for molded product (cavity) in the mold 20. During this procedure, air in the cavity is discharged to the exterior through a gas vent and replaced by the molten material.

The mold 20 is kept at a relatively low temperature as compared with the heating cylinder 81 to accelerate the flow of the molten material or cool and solidify the molten material. The temperature of the mold 20 is controlled by circulating hot water or heat medium through a hole drilled in the mold 20 or by a cartridge heater, band heater or the like.

When the molten material begins to solidify in the cavity of the mold 20, it shrinks. In order to compensate for the shrinkage, the molten material is then injected into the molding material injection gate 21 through the injection nozzle 86. In this manner, the dimensional precision of the molded product can be enhanced.

When pressing is not continued until the solidification of the molten material in the molding material injection gate 21 after the filling of the cavity of the mold 20 with the molten material, the molten material flows backward due to the visco elasticity of the separator material, causing defects in the molded product. Accordingly, pressing is continued until the molten material in the gate 21 is solidified after the filling of the cavity of the mold 20 with the molten material.

Figure 15:
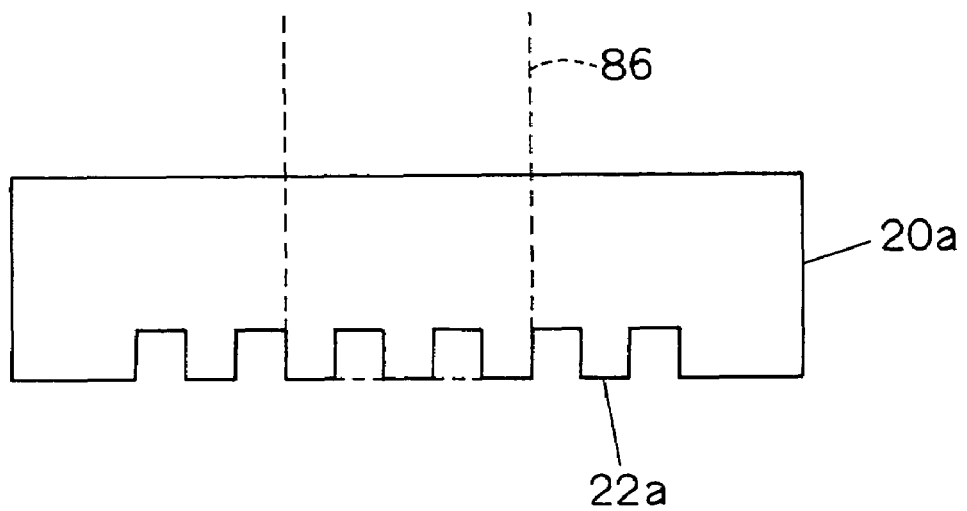
FIG. 15 is an enlarged view of the portion at which the nozzle of the apparatus (injection molding machine) of producing a fuel cell separator according to the Embodiment 1 of implementation of the invention and the mold come in contact with each other.

FIG. 15 illustrates an enlarge view of the mold portion 20a and the injection nozzle 86. The forward end of the injection nozzle 86 is inserted into the molding material injection gate 21 up to the flow path groove raised portion 22a corresponding to the six parallel grooves of the cooling medium flow path 4 having the aforementioned configuration formed on the surface 1a of the separator.

After the solidification of the separator material in the cavity, the injection nozzle 86 is withdrawn from the molding material injection gate 21 of the mold 20. In this manner, since the forward end of the injection nozzle 86 has been inserted into the molding material injection gate 21 up to the flow path raised portion 22a, the material is cut off (broken off) at the end surface of the separator thus molded, leaving a molding material injection gate mark 12 as shown in the separator 1 of FIG. 1 formed in the separator thus molded.

Subsequently, the mold 20 is opened and divided into the mold portion 20a and the mold portion 20b. An ejection mechanism (not shown) is then protruded so that the separator thus molded is caught by a robot which then puts it on a predetermined site or packs it in a box. In this manner, a separator is molded.

While the Embodiment 1 of implementation of the invention has been described with reference to the case where the solidification of the separator material in the cavity of the mold 20 is followed by the withdrawal of the injection nozzle 86 from the molding material injection gate 21 of the mold 20 and the subsequent division of the mold 20 into the mold portion 20a and the mold portion 20b, the invention is not limited thereto. The solidification of the separator material in the cavity of the mold 20 may be followed by the withdrawal of the injection nozzle 86 from the molding material injection gate 21 of the mold 20 and the division of the mold 20 into the mold portion 20a and the mold portion 20b at the same time.

While the Embodiment 1 of implementation of the invention has been described with reference to the mold 20 for separator (W/A) 1, it can apply also to the molds 60, 70 for other separators (C/W) 2 and (C/A) 3, respectively.

The thickness of the separators 1, 2 and 3 was 3 mm. The flow paths formed on the both sides of the tablet each were formed by a groove having a pitch of 3 mm (groove width: 1.5 mm). As shown in FIGS. 1 to 3, there were provided around the flow paths inlet and outlet oxidizing gas manifolds 9, 10, fuel gas manifolds 7, 8 and cooling water manifolds 5, 6 with the thickness of 3 mm. The flow paths were formed extending between the various inlet manifolds and outlet manifolds provided on the resin site. In some detail, referring to the oxidizing gas flow path, six adjacent grooves were in zigzag configuration. Referring to the fuel gas flow path, two adjacent grooves were in zigzag configuration. Referring to the cooling medium flow path, six adjacent grooves were in zigzag configuration.

As mentioned above, there were prepared three separators, i.e., separator (C/A) 3 having oxidizing gas flow path 13 provided on one side thereof and a fuel gas flow path 11 provided on the other, separator (C/W) 2 having an oxidizing gas flow path 13 provided on one side thereof and a cooling medium flow path 4 provided on the other, separator (W/A) 1 having a fuel gas flow path 11 provided on one side thereof and a cooling medium flow path 4 provided on the other.

Three marks of gate through which the injection molding material is injected into the cavity for separator were formed between the cooling water inlet manifold 5 and the cooling water outlet manifold 6 in the separator (W/A) 1. The molding material injection gate marks 12 each had a fallen portion having the same depth as that of the groove of the oxidizing gas flow path 13. The fallen portion was formed within the width of 3 pitches so as to extend over within the width of six grooves having the same gas flowing direction.

Three molding material injection gate marks 12 were formed between the oxidizing gas inlet manifold 9 and the oxidizing gas outlet manifold 10 in the separator (C/W) 2. The molding material injection gate marks 12 each had a fallen portion having the same depth as that of the groove of the cooling medium flow path 4. The fallen portion was formed within the width of 3 pitches so as to extend over within the width of six grooves having the same cooling water flowing direction.

Three molding material injection gate marks 12 were formed between the oxidizing gas inlet manifold 9 and the oxidizing gas outlet manifold 10 in the separator (C/A) 3. The molding material injection gate marks 12 each had a fallen portion having the same depth as that of the groove of the oxidizing gas flow path 13. The fallen portion was formed within the width of 3 pitches so as to extend over within the width of six grooves having the same gas flowing direction.

It was made obvious from calculation by structural analysis that the disposition of the gate marks on the various separators in such an arrangement that the three gate fallen portions are imposed on each other when the separators are stuck is desirable from the standpoint of reduction of shearing stress on MEA, reduction of shearing stress on separator and reduction of contact resistivity of MEA with separator. To this end, molding material injection gate were provided on the various molds in such an arrangement that the gate marks on the various separators are imposed on each other, and the various separators were then prepared.

Referring to the separator (C/W), the molding material injection gate marks 12 maybe provided on the side 2b thereof where the cooling medium flow path is formed.

Subsequently, MEA 40 was disposed interposed between the three separators 1, 2 and 3 and the gasket 41 as shown in FIG. 10 to assemble a cell.

Finally, 50 cells comprising MEA 40 were stuck. The laminate thus prepared was then fastened by a stainless steel end plate 33 and a fastening bolt 34 at a pressure such that the pressure of the surface of MEA 40 against the separators 1, 2 and 3 was 10 kgf/cm2 with end separators 50, 51 of FIGS. 8 and 11 prepared by cutting a carbon plate, a collector 31 and an insulating plate 32 interposed therebetween. When the fastening pressure is too small, the gas leaks and the contact resistivity is great, deteriorating the cell performance. On the contrary, when the fastening pressure is too great, the electrodes break or the separators deform. It was thus important to change the fastening pressure according to the design of the gas flow path groove.

The stuck cell prepared according to the configuration and production method of the Embodiment 1 of implementation of the invention was checked for leakage. For the leakage check, He gas was introduced into the cell through the inlet manifold at a pressure of 0.5 kgf/cm$^2$ with the outlet manifold of the flow path closed. The flow rate of incoming gas was then measured to evaluate leakage resistance.

As a result, it was confirmed that none of the air side, the fuel gas side and the cooling water side showed gas leakage, raising no problems with fluid tightness of stuck cell.

Separators were then prepared in the same manner as described above except that one molding material injection gate mark was formed at substantially the middle point between the inlet manifold and the outlet manifold. The shape of the gate mark was the same as that of the aforementioned separators. During injection molding, the injection molding material is injected into the mold for separator through one gate disposed on the center of the separator. Therefore, during the filling of the mold for separator with the injection molding material, the flow path resistivity against the material flowing toward the periphery of the mold for separator is made uniform over all directions because the distance toward all directions from the gate as center are equal. Accordingly, the interior of the mold for separator was uniformly filled with the material. The molding time was reduced by 0.1 seconds from that of the separator of Comparative Example 2 described later as calculated in terms of unit length. Further, the distance toward all directions are made uniform, making the radiating area of the material injected uniform. Moreover, since the gate is disposed in the vicinity of the center of the flow path forming portion, the molten material which can flow most easily (lowest viscosity) can be injected into the flow path forming portion, which gives the highest flow path resistivity, making it possible to reduce the flow path resistivity developed when the molten material flows through the flow path forming portion. Further, the transmission of the injection pressure of the molten material can be sufficiently made, resulting in the enhancement of moldability of material in the mold (reduction of surface roughness, enhancement of strength of weld portion, enhancement of material injectability) gas ventilation and dimensional precision. Moreover, the sites other than the flow path forming portion are simpler in configuration than the flow path forming portion and thus can give a sufficient moldability even with the molten state of the material which has passed through the flow path forming portion.

Further, the reduction of the flow path resistivity makes it possible to assure similar moldability even when the injection pressure is reduced. The numeral values thus obtained are set forth in tables given later. In this arrangement, the necessity of a special molding machine capable of molding a material at high pressure can be eliminated, making it possible to reduce required facility investment and hence expect an effect of reducing cost. In the case where there is provided a facility capable of molding a machine at high pressure, if the pressure at which the material is extruded remains constant, the reduction of the flow path resistivity makes it possible to reduce the time required for fill the mold with the molding material and hence the molding cycle. Accordingly, the enhancement of productivity and the cost reduction are made possible.

The aforementioned effect was exerted even with the case where three molding material injection gate marks are formed between the inlet manifold and the outlet manifold. However, in the case where one gate is formed in the vicinity of the middle point between the inlet and the outlet, the uniformity in the spread of the molding material from the gate as center in all directions is particularly remarkable.

COMPARATIVE EXAMPLE 1

As separators of Comparative Example 1 there were prepared three separators using a mold having the same configuration as that of the Embodiment 1 of implementation of the invention except that the position of the molding material injection gate 21 is different from that of the Embodiment 1.

Figures 16A, 16B:
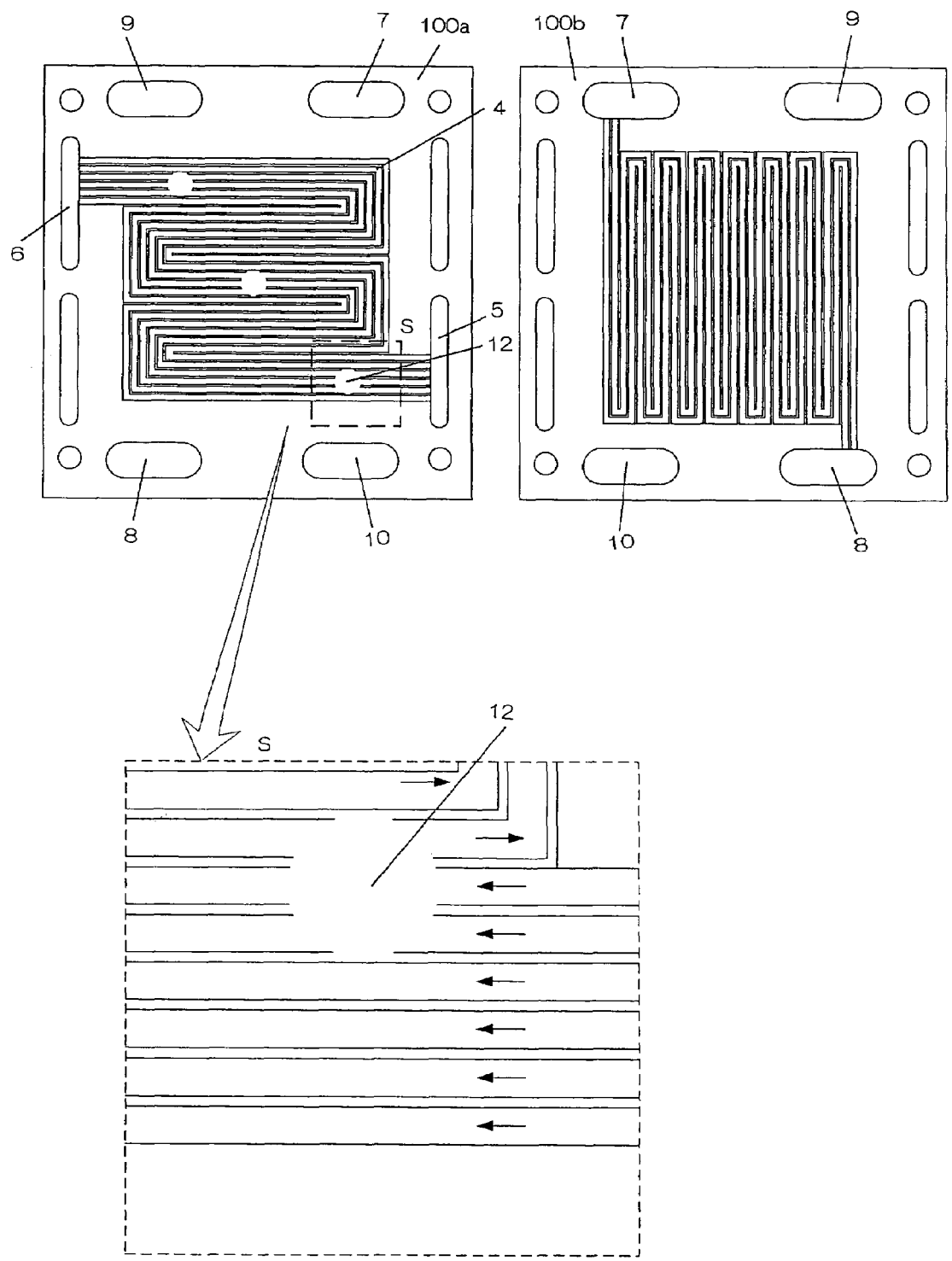
FIG. 16A is a plan view of the side of the fuel cell separator (W/A) according to Comparative Example 1 of the invention on which a cooling medium flow path is formed.
FIG. 16B is a plan view of the side of the fuel cell separator (W/A) according to Comparative Example 1 of the invention on which a fuel gas flow path is formed.

FIG. 16A is a plan view of the side 100a of a separator (W/A) 100 of Comparative Example 1 on which a cooling medium flow path 4 is formed. FIG. 16B is a plan view of the separator (W/A) 100 of Comparative Example 1 on which a fuel gas flow path 11 is formed 100B. S is an enlarge view of the portion surrounded by the broken line in FIG. 16A.

As shown in FIG. 16A, the molding material injection gate marks 12 are disposed on the cooling medium flow path 4 in the separator (W/A) 100 produced in Comparative Example 1 as in the case of the separator (W/A) 1. The molding material injection gate mark 12 is formed at three points between the cooling water inlet manifold 5 and the cooling water outlet manifold 6 and has a fallen portion having the same depth as that of the groove of the cooling medium flow path 4.

As shown in the enlarged view S of FIG. 16A, two of the three molding material injection gate marks 12 of Comparative Example 1 each are formed extending over three grooves two of which have the same flowing direction and the rest of which has the opposite flowing direction.

As in the aforementioned configuration, the position of the molding material injection gates 21 in the mold was changed in such an arrangement that the molding material injection gate 12 marks each are formed on extending over three grooves two of which have the same flowing direction and the rest of which has the opposite flowing direction as compared with the separator (C/W) 2 and separator (C/A) 3 according to the Embodiment 1 of implementation of the invention. Using this mold, a separator (C/W) 102 and a separator (C/A) 103 were prepared (not shown).

The position of the molding material injection gate marks 12 on the various separators were arranged such that the three molding material injection gate marks 12 are imposed on each other when the separators are stuck.

As separators there were used the aforementioned separators. Using these separators, a stuck cell was then prepared in the same manner as in the Embodiment 1 of implementation of the invention. The cell thus prepared, too, was checked for leakage. As a result, it was confirmed that the cell has no problems of tightness.

COMPARATIVE EXAMPLE 2

Using a mold arranged such that molding material injection gate marks are formed on the edge of the separator, the molten material was injected into the cavity for film through the gates disposed at the edge of the mold to prepare a separator as a separator of Comparative Example 2. The basic configuration of the mold was hot runner as in the Embodiment 1 of implementation of the invention. The mold material, the mold temperature and the injection nozzle temperature were the same as that of the Embodiment 1. Molding was effected at an injection pressure of 1,600 kgf/cm². The results are set forth in Table 1 below as compared with the results of the separator according to the Embodiment 1 of implementation of the invention.

When material filling is poor in Table 1, the surface of the separator is visibly honeycombed with holes, which are not less than 0.5 mm in diameter.

When material filling is good in Table 1, the surface of the separator is not visibly honeycombed but only a part of its cross section is with holes, which are less than 0.1 mm in diameter.

When material filling is excellent in Table 1, neither the surface nor the cross section of the separator is visibly honeycombed.

When surface roughness is much in No. 1 and No. 2 in Table 1, the surface roughness of the separator is not less than 500 S.

When surface roughness is medium in No. 3 in Table 1, the surface roughness of the separator is between 200 to 300 S.

When surface roughness is small in Table 1, the surface roughness of the separator is less than 12.5 S.

When strength of weld portion is poor in Table 1, the bending strength of the separator is not more than 30 MPa.

When strength of weld portion is fair-poor in Table 1, the bending strength of the separator is between 30 MPa and 40 MPa.

When strength of weld portion is good in Table 1, the bending strength of the separator is not less than 40 MPa.

When dimensional precision is poor in Table 1, the thickness precision of the separator is beyond the limits of ±50 μm and the separator has developed a warp not less than 1 mm.

When dimensional precision is good in Table 1, the thickness precision of the separator is within the limits of ±50 μm and the separator has developed a warp less than 1 mm.

When gas ventilation is poor in Table 1, not less than one third of the surface of the separator is rough due to the gas.

When gas ventilation is fair in Table 1, not less than one tenth of the surface of the separator is rough due to the gas.

When gas ventilation is good in Table 1, the surface of the separator is not rough due to gas.

In order to eliminate definite underfilling of injection material, an injection pressure of 3,000 kgf/cm² was needed. A separator having no gate fallen portion in the flow path portion as in the related art was prepared.

A stuck cell was then prepared in the same manner as in the Embodiment 1 of implementation of the invention except that only the separator was changed to the aforementioned separator. The cell thus prepared, too, was then checked for leak-

TABLE 1

| No. | Injection pressure (kgf/cm²) | Material filling | Surface roughness | Strength of weld portion | Dimensional precision | Gas ventilation | Remarks |
| --- | --- | --- | --- | --- | --- | --- | --- |
| 1 | 1,600 | Poor | Much | Poor | Poor | Poor | Unmoldable |
| 2 | 2,200 | Poor | Much | Poor | Poor | Poor | Unmoldable |
| 3 | 3,000 | Good | Medium | Fair - poor | Poor | Fair | Many weld portions; Raised surface roughness due to gas; desired dimension not attained |
| Embodiment 1 (Three molding material injection gate marks) | 1,600 | Good | Small | Good | Good | Good | Good |
| Embodiment 1 (One molding material injection gate mark) | 1,600 | Excellent | Small | Good | Good | Good | Good uniformity in filling | age. As a result, it was confirmed that cross leak had occurred at the manifolds, raising problems of tightness.

The molded state of the separators prepared in the Embodiment 1 of implementation of the invention and Comparative Examples 1 and 2 are set forth in Table 2 below.

TABLE 2

| Properties | | Embodiment 1 | Comparative Example 1 | Comparative Example 2 |
|---|---|---|---|---|
| Dimensional precision | Warpage | None | None | Much |
| | Dispersion in thickness | None | None | Much Thick gate Wedge-shaped cross section |
| | Moldability | Good | Good | Poor Roughness on the side opposite the gate due to gas generated |
| Gas tightness | | Good | Good | Poor Great gas permeation at weld portion and gas-roughened portion |
| Mechanical strength | | Good | Good | Poor Many weld portions produced Crack at weld portion |
| Contact resistivity | | Little | Little | Much Great dispersion from site to site |
| Judgment | | Good | Good | Poor |

When warpage is none in dimensional precision in Table 2, the separator has developed a warp less than 1 mm.

When warpage is much in dimensional precision in Table 2, the separator has developed a warp not less than 1 mm.

When dispersion in thickness is none in dimensional precision in Table 2, the thickness of the separator is less than ±50 µm.

When dispersion in thickness is much in dimensional precision in Table 2, the thickness of the separator is not less than ±50 µm.

When moldability is good in dimensional precision in Table 2, the surface of the separator is not rough due to gas.

When moldability is poor in dimensional precision in Table 2, a part of the surface of the separator is rough due to gas.

When gas tightness is good in Table 2, the difference of the thickness is 50 kPa and the amount of the leakage of He is less than 0.1 ccm (ND).

When gas tightness is poor in Table 2, the difference of the thickness is 50 kPa and the amount of the leakage of He is not less than 0.1 ccm (ND).

When mechanical strength is good in Table 2, the bending strength of the separator is not less than 40 MPa.

When mechanical strength is poor in Table 2, the bending strength of the separator is less than 40 MPa.

When contact resistivity is little in Table 2, the contact resistivity of the separator is less than 20 m$\Omega \cdot cm^2$ under the pressure of the surface of 1 MPa.

When contact resistivity is much in Table 2, the contact resistivity of the separator is not less than 20 m $\Omega \cdot cm^2$ under the pressure of the surface of 1 MPa.

The separator has a flow path portion at its center having a complicated configuration surrounded by sites having a relatively great thickness. When the molten injection material is injected into the mold, the flow path portion acts as a great resistivity against the flow of the molten material while the peripheral sites gives a relatively small resistivity against the flow of the molten material. Therefore, as in Comparative Example 2, when the molten material is injected from the edge of the mold, the filling begins with the peripheral sites, through which the molten material can flow more easily than through the flow path portion, and the filling of the flow path portion falls behind.

As a result, as set forth in Table 2, many weld portions were produced, causing the deterioration of mechanical strength. Further, there is a difference in filling rate of material that causes the deterioration of gas ventilation. Moreover, when the filling distance is too long, the molten separator material, which has a good thermal conductivity, begins to cure in the course of filling, causing under filling, drop of dimension precision, drop of strength, drop of gas tightness and dispersion of resistivity.

On the contrary, referring to the Embodiment 1 of implementation of the invention and Comparative Example 1, the molding material injection gates are formed on the flow path portion, where the molten material can flow most difficultly, making it possible for the molten material to fill thoroughly the site which can be filled most difficultly when its fluidity is high. Further, since the gates are disposed in the vicinity of the center of the mold, the filling distance of the molten material can be reduced. In this arrangement, the adverse effect of curing of molten material by cooling on filling is smallest, giving a good dimensional precision, mechanical strength and gas tightness and making it possible to reduce the dispersion of resistivity.

The polymer electrolyte fuel cells of the Embodiment 1 of implementation of the invention and Comparative Example 1 were each kept at 85° C. where hydrogen gas which had been moistened and heated to have a dew point of 83° C. was supplied into the fuel gas side electrode while air which had been moistened and heated to have a dew point of 78° C. was supplied into the oxidizing gas side electrode. As a result, a cell open-circuit voltage of 50 V was obtained during unloaded operation, that is, when no current is outputted to the exterior.

The cell was allowed to make constant electricity-generation under conditions of percent fuel utilization of 80%, percent oxygen utilization of 40% and a current density of 0.5 A/cm$^2$. The output characteristics of the cell are shown in FIG. 17.

Figure 17:
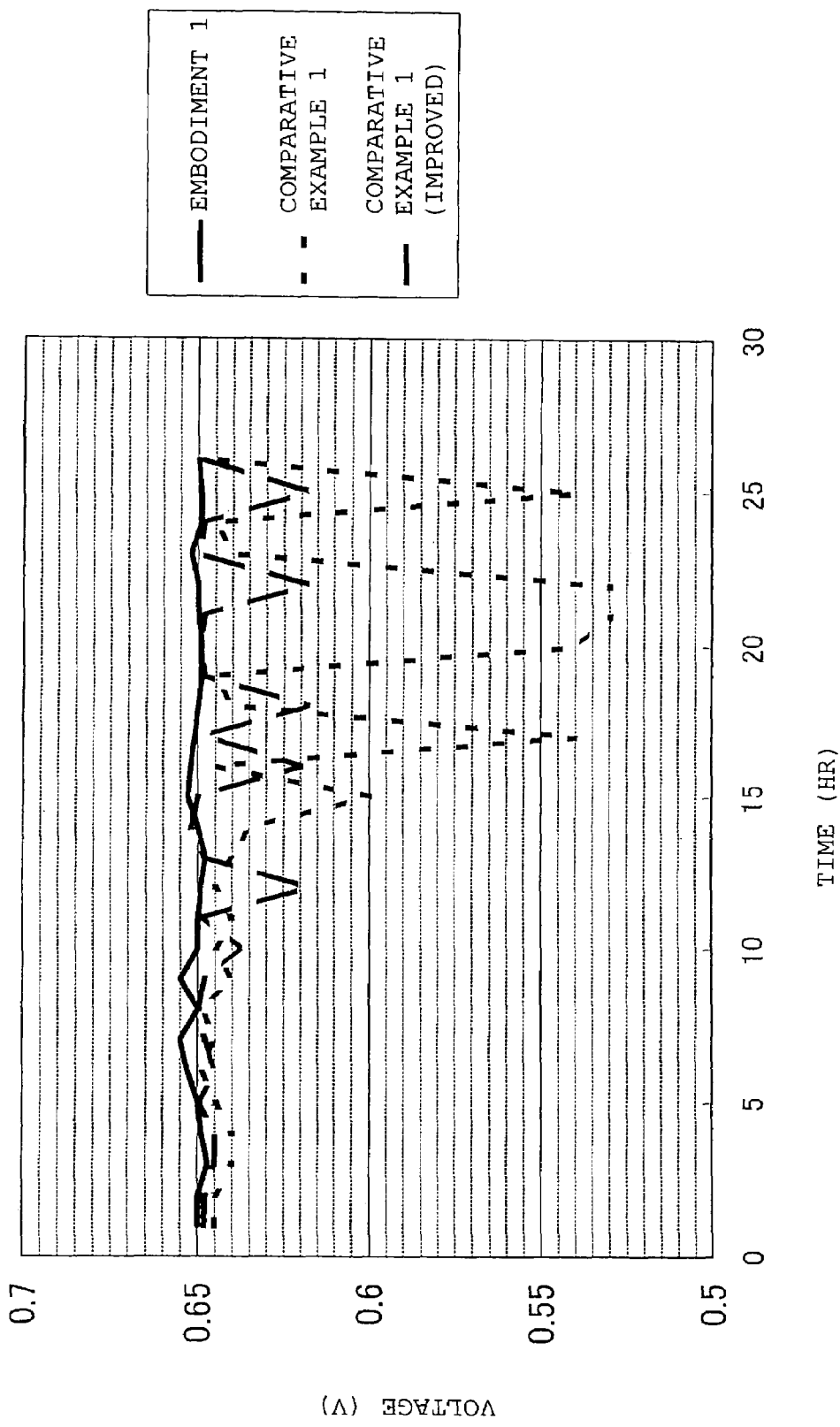
FIG. 17 is a graph illustrating the output characteristics of a fuel cell comprising a fuel cell separator according to the Embodiment 1 of implementation of the invention and a fuel cell comprising a fuel cell separator according to Comparative Example 1.

As a result, the cell according to the Embodiment 1 of implementation of the invention has a voltage on a high level and a voltage dispersion as small as ±5 mV from sample to sample as shown in FIG. 17. On the contrary, the stuck cell of Comparative Example 1 had a voltage as low as −5 mV lower than that of the inventive stuck cell. The stuck cell of Comparative Example 1 showed an initial voltage dispersion of ±5 mV but showed a voltage fluctuation and a voltage dispersion of −100 mV with time and thus was not operated stably.

The cell of Comparative Example 1 was then disassembled. The site in the molding material injection gate marks 12 extending over three grooves in the fuel gas flow path and the oxidizing gas flow path where the gas flows in opposing directions was partitioned by fixing a rib made of carbon thereto so that the gases flowing in opposing directions are not mixed. These parts were reassembled to a cell which was then measured for performance. The cell thus reassembled showed a voltage as low as −2 mV lower than that of the Embodiment 1 of implementation of the invention but showed reduction of voltage dispersion to about −30 mV even after lapse of time.

The cell was again disassembled. The site in the gate fallen portion having the cooling medium flow path formed thereon where the cooling water flows in opposing directions was partitioned by fixing a rib made of carbon thereto similarly to the case above so that the cooling water flowing in opposing directions are not mixed. These parts were reassembled to a cell which was then measured for performance. The cell thus reassembled showed a voltage on the same level as that of the Embodiment 1 of implementation of the invention. The cell thus reassembled showed no voltage dispersion with time and thus had the same performance as that of the Embodiment 1 of implementation of the invention.

It was thus made obvious that gas or cooling water makes drastic shortcut at the molding material injection gate marks 12 in the separator, making it impossible to stably supply air or cooling water into the main flow path site disposed ahead the molding material injection gate marks 12 and hence causing the drop of voltage due to local temperature rise, the drop of voltage due to local diffusion polarization and the fluctuation of voltage due to instability of flow. It was thus found that the molding material injection gate, if formed extending over a plurality of flow paths, should be disposed over flow paths the flowing direction of which are the same to advantage.

COMPARATIVE EXAMPLE 3

As the separator of Comparative Example 3 there was prepared a separator having a molding material injection gate mark 12 formed at three points between the fuel gas inlet manifold 7 and the fuel gas outlet manifold 8 on the side 3b of the separator (C/A) 3 using a mold having the molding material injection gate 21 disposed in a position different from that described above.

In this configuration, since the fuel gas side flow path comprised two passes, the molding material injection gate mark 12 had a width greater than the two flow paths and thus extended over three grooves. The reduction of the width of the molding material injection gate 21 was limited from the standpoint of limitation of machining of gate in the mold and durability of gate.

In the resulting configuration, gases flowing in opposite directions were mixed in the fuel gas flow path 11, causing voltage drop and dispersion as encountered in the cell of Comparative Example 1. It was thus found undesirable to form a gate fallen portion in the fuel gas side flow path.

Embodiment 2

Another embodiment will be described below. As the elements other than separator there were used the same elements as used in the Embodiment 1 of implementation of the invention. Evaluation was conducted in the following manner.

In the Embodiment 2 of implementation of the invention, too, as the compound for electrically-conductive site there was used a 7:3 mixture (by weight) of graphite and PPS (polyphenylene sulfide) resin as used in the Embodiment 1 of implementation of the invention. Molding was then conducted in such an arrangement that the molding material injection gate marks 12 to be formed on the flow path were formed in the positions as set forth in Table 3.

The injection molding machine used was the same as used in the Embodiment 1 of implementation of the invention except the injection pressure. The various separators thus prepared were each subjected to cell test in the same manner as in the Embodiment 1 of implementation of the invention. The configuration of the separator other than the molding material injection gate mark 12 and the configuration of the stuck cell were the same as in Example 1. The results are set forth in Table 3 below.

TABLE 3

| Position of gate in flow path portion | | 3 points at equal interval between inlet and outlet | 1 point in the middle between inlet and outlet | 4 radial points and 1 point at center |
|---|---|---|---|---|
| Moldability | Filling | Good | Good | Excellent |
| | Welded portion | Little | Little | Little or none |
| | Dimensional precision | Good | Good | Good |
| | Injection pressure (kgf/cm$^2$) | 1,600 | 2,000 | 1,300 |
| Gas tightness | | Good | Good | Good |
| Mechanical strength | | Good | Good | Good |
| Cell performance | Voltage | Good | Excellent | Fair |
| | Voltage dispersion | Little | Little or none | Little |
| Judgment | | Good | Excellent | Good |

When filling is good in moldability in Table 3, the surface of the separator is not visibly honeycombed but only a part of its cross section is with holes, which are less than 0.1 mm in diameter.

When filling is excellent in Table 3, neither the surface nor the cross section of the separator is visibly honeycombed.

When welded portion is little in moldability in Table 3, the surface of the separator is not visibly honeycombed but only a part of its cross section is with holes, which are less than 0.1 mm in diameter.

When welded portion is excellent in Table 3, neither the surface nor the cross section of the separator is visibly honeycombed.

When dimensional precision is good in moldability in Table 3, the surface of the separator is not rough due to gas.

When gas tightness is good in Table 3, the difference of the thickness is 50 kPa and the amount of the leakage of He is less than 0.1 ccm (ND).

When mechanical strength is good in Table 3, the bending strength of the separator is not less than 40 MPa.

When voltage is good in cell performance in Table 3, the voltage of the cell is −2 mV under the base voltage.

When voltage is excellent in cell performance in Table 3, the voltage of the cell keeps the base voltage.

When voltage is fair in cell performance in Table 3, the voltage of the cell is −5 mV under the base voltage.

In the above description, base voltage means our standard voltage.

When voltage dispersion is good in cell performance in Table 3, the voltage dispersion is within ±10 mV.

When voltage dispersion is excellent in cell performance in Table 3, the voltage dispersion is within ±5 mV.

The configuration comprising only one gate mark formed between the inlet and the outlet of the flow path portion showed the highest voltage and a small voltage dispersion and thus gave good results. The configuration comprising five gate marks formed therein showed an enhanced moldability and thus gave the best results in dimensional precision, mechanical strength and gas tightness. However, this configuration had a gate mark present at five points in the flow path portion and showed an increased contact resistivity with MEA that gave a voltage slightly lower than the other configurations.

The configuration comprising one gate mark formed therein was then subjected to flow analysis of molten material in the mold. As a result, it was found that the provision of one gate in almost the middle between the inlet and the outlet of the flow path makes it possible to provide excellent material filling and gas ventilation.

Gate marks are provided in the flow path portion as described above. The use of a mold comprising molding material injection gates formed at many points around the flow path in addition to the flow path portion gates having the aforementioned configuration makes it possible to prepare a separator with a higher moldability.

The use of the mold for fuel cell separator according to the Embodiment 1 of implementation of the invention and the producing method using the mold leads to the enhancement of moldability that raises the proportion of the electrically-conductive filler in the compound, making it possible to raise the electrical conductivity of the separator and hence enhance the cell performance.

In the Embodiment 1 of implementation of the invention, since there were two fuel gas flow path grooves, the fuel gas flow path forming portion in the mold had no molding material injection gates formed therein. However, in order to increase the number of fuel gas flow path grooves to three and form the molding material injection gate mark within the width of three grooves, the molding material injection gate may be provided in the fuel gas flow path forming portion. In other words, it suffices if the separator is produced such that the molding material injection gate mark is in the site where the flowing direction of flow path grooves are the same. In order to operate the fuel cell stably, it is necessary to assure a constant flow rate. However, since the total flow rate of the fuel gas is smaller than that of the oxidizing gas, it is more desirable that the number of the fuel gas flow path grooves is less.

While the molding material injection gates of the invention are provided only one of the mold portions in the Embodiment 1 of implementation of the invention, they may be provided on both the upper and lower mold portions. However, when an arrangement is made such that there are provided no molding material injection gates in the fuel gas flow path forming portion as in the Embodiment 1 of implementation of the invention, the molding material injection gates can be provided on both the upper and lower mold portions only for the separator (C/W). This is because the mold for separator (C/W) comprises an oxidizing gas flow path forming portion provided on one mold portion and a cooling medium flow path forming portion provided on the other.

While the present embodiment has been described with reference to the case where the stack 30 comprises single cells 42 interposed between single cells 43, the invention is not limited to the configuration according to the present embodiment of implementation of the invention. For example, the stack 30 may be composed of only elementary cell 42 or 43.

While the fuel cell separator prepared using the mold for fuel cell separator according to the invention corresponds to the separator for solid polymer electrolyte fuel cell in the Embodiments 1 and 2 of implementation of the invention, the invention is not limited thereto. The fuel cell separator according to the invention may be a separator for phosphoric acid type fuel cell. In other words, the fuel cell separator according to the invention merely needs to be a separator prepared by injection molding such that molding material injection gate marks are left in the flowpath portion having grooves the flowing direction of which are the same.

While the Embodiment 1 of implementation of the invention has been described with reference to the case where the compound comprises PPS resin incorporated therein as a binder resin, it goes without saying that the same effect can be exerted even when as binder resins there are used other thermoplastic resins such as polyethylene, polystyrene, polypropylene, methacrylic resin, polyethylene terephthalate, polycarbonate, polyamide, polyimide, polyvinyl alcohol, polyphenylene sulfide, polyether ketone, polyetherimide, fluororesin, ester resin, liquid crystal polymer, aromatic polyester, polyacetal and polyphenylene ether in combination with carbon-based materials such as natural graphite, artificial graphite, expanded graphite, mesophase carbon, acetylene black, Ketchen black, carbon black and glassy carbon or metallic fillers as electrically-conductive fillers.

As the binder resin there may be also used a thermosetting resin such as phenolic resin, urea resin, melamine resin, unsaturated polyester resin, diallyl phthalate resin and epoxy resin. In the case where such a binder resin is used, the temperature in the mold is raised higher than that in the nozzle during molding to heat and cure the material thus injected. However, the producing time required for molding of the thermosetting resin compound is about 120 seconds while that of the thermoplastic resin compound is about 40 seconds.

In accordance with the mold for fuel cell separator, method of producing a fuel cell separator, a fuel cell separator, an apparatus of producing a fuel cell separator and a fuel cell of the invention, a high dimensional stability, a high gas tightness, a reduced resistivity and a high mechanical strength can be assured. Accordingly, a separator and a polymer electrolyte fuel cell capable of providing an enhanced reliability, an enhanced cell performance and a drastically reduced mass-production cost can be provided. The fuel cell according to the invention is useful as a portable electric supply, electric supply for electric car, household cogenerating system, etc.

What is claimed is:

1. A fuel cell separator comprising a flow path surface formed thereon having an oxidizing gas flow path for supplying an oxidizing gas into one of a pair of electrodes disposed on the respective side of an electrolyte,
   a fuel gas flow path for supplying a fuel gas into the other of the pair of electrodes or a cooling medium flow path for cooling, and
   at least one molding material injection gate mark formed to overlap a plurality of grooves comprising the oxidizing gas flow path on the flow path surface, wherein said grooves are connected with each other through said molding material injection mark, and wherein a direction of flowing is the same in said grooves over which said molding material injection gate mark is formed.

2. A fuel cell comprising a stack of single cells having an electrolyte membrane, a pair of gas diffusion electrodes disposed on the respective side of the electrolyte membrane and a pair of separators disposed with the pair of gas diffusion electrodes interposed therebetween, wherein the separator is a fuel cell separator as described in claim 1.

* * * * *

UNITED STATES PATENT AND TRADEMARK OFFICE
CERTIFICATE OF CORRECTION

PATENT NO. : 7,501,199 B2
APPLICATION NO. : 10/970025
DATED : March 10, 2009
INVENTOR(S) : Hideo Ohara Page 1 of 1

It is certified that error appears in the above-identified patent and that said Letters Patent is hereby corrected as shown below:

On the title page of the patent, under Item "(73) Assignee", change "Osaks" to --Osaka--;

In the claims, in Column 30, Line 49 (Claim 1), change "comprising the" to --comprising at least one of the--; and Line 50 (Claim 1), change "gas flow path on the" to --gas flow path, the fuel gas flow path and the cooling medium flow path on the--.

Signed and Sealed this

Thirtieth Day of June, 2009

JOHN DOLL
*Acting Director of the United States Patent and Trademark Office*